(12) United States Patent
Lyle et al.

(10) Patent No.: US 6,971,028 B1
(45) Date of Patent: Nov. 29, 2005

(54) SYSTEM AND METHOD FOR TRACKING THE SOURCE OF A COMPUTER ATTACK

(75) Inventors: Michael P. Lyle, San Jose, CA (US); James R. Maricondo, Palo Alto, CA (US)

(73) Assignee: Symantec Corporation, Cupertino, CA (US)

( * ) Notice: Subject to any disclaimer, the term of this patent is extended or adjusted under 35 U.S.C. 154(b) by 932 days.

(21) Appl. No.: 09/615,676

(22) Filed: Jul. 14, 2000

Related U.S. Application Data

(60) Provisional application No. 60/151,531, filed on Aug. 30, 1999.

(51) Int. Cl.⁷ .......................... G06F 7/72; G06F 11/30; G06F 15/173
(52) U.S. Cl. ................. 713/201; 709/224; 712/220
(58) Field of Search ................ 713/200, 201; 709/224; 712/220

(56) References Cited

U.S. PATENT DOCUMENTS

| | | | |
|---|---|---|---|
| 5,107,489 A | | 4/1992 | Brown et al. ............... 370/58.2 |
| 5,301,333 A | * | 4/1994 | Lee ............... 710/244 |
| 5,485,409 A | * | 1/1996 | Gupta et al. ............... 713/200 |
| 5,574,912 A | * | 11/1996 | Hu et al. ............... 712/220 |
| 5,606,669 A | | 2/1997 | Bertin et al. ............ 395/200.15 |
| 5,790,808 A | | 8/1998 | Seaman ................. 395/200.53 |
| 5,892,903 A | | 4/1999 | Klaus .................... 395/187.01 |
| 5,991,881 A | * | 11/1999 | Conklin et al. ............ 713/201 |
| 6,049,546 A | | 4/2000 | Ramakrishnan ............. 370/412 |
| 6,067,620 A | * | 5/2000 | Holden et al. ............... 713/155 |
| 6,141,686 A | * | 10/2000 | Jackowski et al. ........... 709/224 |
| H1944 H | * | 2/2001 | Cheswick et al. .......... 713/201 |
| 6,233,686 B1 | * | 5/2001 | Zenchelsky et al. ........ 713/201 |
| 6,311,274 B1 | * | 10/2001 | Day ............................ 713/201 |
| 6,321,338 B1 | | 11/2001 | Porras et al. ............... 713/201 |
| 6,408,391 B1 | * | 6/2002 | Huff et al. .................. 713/201 |
| 6,442,694 B1 | * | 8/2002 | Bergman et al. ............ 713/201 |
| 6,453,345 B2 | * | 9/2002 | Trcka et al. ................ 709/224 |

(Continued)

FOREIGN PATENT DOCUMENTS

JP        08032611 A        2/1996

(Continued)

OTHER PUBLICATIONS

Knuth, "The Art of Computer Programming, vol. 1," 2nd Edition, 1973, pp. 234-238.*

(Continued)

*Primary Examiner*—Andrew Caldwell
*Assistant Examiner*—Matthew Heneghan
(74) *Attorney, Agent, or Firm*—Van Pelt, Yi & James LLP

(57) ABSTRACT

A system and method are disclosed for detecting and processing attacks on a computer network. Data indicating an attack may be taking place is received. The data is associated with an event. The data is placed in a selected one of a plurality of queues of data to be processed. The data in the queue is processed. Each queue is configured to store one or more sets of data, each set of data being associated with an event to be processed. An administrative domain may be notified that an attack may be taking place. The destination administrative domain may or may not be associated with other than the sending administrative domain. The source of an attack may be identified. Messages associated with an attack may be tracked back to identify a point of attack at which messages associated with the attack are entering a network.

34 Claims, 20 Drawing Sheets

600

|   | 0 | 1 | 2 | 3 | 4 | 5 | 6 |
|---|---|---|---|---|---|---|---|
| 0 |   | A-B-C |   |   | F |   |   |
| 1 |   |   | D-G |   |   |   |   |
| 2 |   |   |   |   | E |   |   |

U.S. PATENT DOCUMENTS

| | | | |
|---|---|---|---|
| 6,484,203 B1 | 11/2002 | Porras et al. | 709/224 |
| 6,499,107 B1 * | 12/2002 | Gleichauf et al. | 713/201 |
| 6,578,147 B1 * | 6/2003 | Shanklin et al. | 713/200 |
| 6,647,400 B1 * | 11/2003 | Moran | 707/205 |
| 6,704,874 B1 | 3/2004 | Porras et al. | 713/201 |
| 6,708,212 B2 | 3/2004 | Porras et al. | 709/224 |
| 6,711,615 B2 | 3/2004 | Porras et al. | 709/224 |

FOREIGN PATENT DOCUMENTS

| | | |
|---|---|---|
| JP | 2000174794 A | 6/2000 |

OTHER PUBLICATIONS

Durst et al., "Testing and Evaluating Computer Intrusion Detection Systems," Jul. 1999.*

Lippmann, Richard P, et al, "Evaluating Intrusion Detection Systems: The 1998 DARPA Off-Line Intrusion Detection Evaluation", Lincoln Laboratory MIT.

Pages regarding DERBI Project from SRI International website at http://www.ai.sri.com/~derbi/.

* cited by examiner

SYSTEM AND METHOD FOR TRACKING THE SOURCE OF A COMPUTER ATTACK

CROSS REFERENCE TO RELATED APPLICATIONS

This application claims priority to U.S. Provisional Patent Application No. 60/151,531 entitled SYSTEM AND METHOD FOR PROVIDING COMPUTER SECURITY filed Aug. 30, 1999 which is incorporated herein by reference for all purposes.

This application is related to co-pending U.S. patent application Ser. No. 09/615,961 entitled SYSTEM AND METHOD FOR PROTECTING A COMPUTER NETWORK AGAINST DENIAL OF SERVICE ATTACKS filed concurrently herewith, which is incorporated herein by reference for all purposes; and co-pending U.S. patent application Ser. No. 09/615,888 entitled SYSTEM AND METHOD FOR DYNAMICALLY CHANGING A COMPUTER PORT OR ADDRESS filed concurrently herewith, which is incorporated herein by reference for all purposes; and co-pending U.S. patent application Ser. No. 09/616,803 entitled SYSTEM AND METHOD FOR QUICKLY AUTHENTICATING MESSSAGES USING SEQUENCE NUMBERS filed concurrently herewith, which is incorporated herein by reference for all purposes.

FIELD OF THE INVENTION

The present invention relates generally to computer security. More specifically, a system and method for tracking the source of a computer attack is disclosed.

BACKGROUND OF THE INVENTION

Computer network owners, operators, and users desire to avoid the inconvenience and potential losses, such as financial or property loss, loss of privacy and confidentiality, and other losses, that can be caused by a breach of computer network security. For example, a computer hacker or other unauthorized user may gain unauthorized access to confidential files on a targeted computer network, may alter or erase files, or may deprive legitimate users of access to the network. When such attacks do occur, those responsible for maintaining network security, such as system security administrators and law enforcement officials, need efficient ways to determine the origin of an attack and disseminate information about the attack within the administrative domain in which the attack is detected and with other administrative domains that may be affected by, or that may be able to take action in response to, the attack.

One current approach to providing security against unauthorized use of or other attacks on computer networks involves making a log of traffic at a particular node within the network and providing the log to technicians who later analyze the data to detect unauthorized users and other attacks. This approach has the disadvantage of not providing the ability to identify and respond to an attack in real time. In addition, typically the node being monitored within the network is fixed. As such, it is possible to determine what attack-related traffic crossed that node, but it is not typically possible to dynamically check other nodes for the same or related traffic, such as to identify in real time the point at which the attack is entering the network.

In addition, under current approaches it is typically necessary for a network security administrator of a network that has been the target of an attack to contact his or her counterpart(s) in other administrative domains identified as the source of the attack, or that are otherwise affected by or associated with the attack. Typically, these individuals exchange information and attempt to reach agreement on an appropriate responsive course of action. This process is time consuming and may result in ineffective remedial measures being taken if the individuals involved fail to agree on an effective course of action.

As a result, there is a need for a way to provide computer security dynamically and in real time. In particular, there is a need for a way to detect actual or potential attacks, dynamically, in real time, and without human intervention. There is also a need for a way to change the node within the network being monitored dynamically so that the source of an attack, i.e., the point at which it is entering the network, may be tracked back.

In addition, there is a need for a way to share information about an attack, dynamically and without human intervention, with other nodes within the administrative domain being attacked. There is also a need for a secure way to share information about an attack, dynamically and without human intervention, between administrative domains, e.g., to enable the source of an attack to be further tracked back to its point of origin rapidly and before potentially useful information is lost, or to enable other administrative domains to take corrective action, such as by terminating the connection or account of a user that is identified as the source of an attack.

Finally, given the critical and protective nature of such security functions, there is a need to provide for the communication of information concerning an attack, whether between nodes within an administrative domain or between different administrative domains, via communications that are themselves protected from compromise by an attacker, such as a denial of service type attack on a port being used for such communication.

SUMMARY OF THE INVENTION

Accordingly, dynamically tracking the source of a computer attack is disclosed. An attack is detected and corrective action is taken in real time. Dynamically changing the node being monitored within a network is described. Tracking the point at which an attack is entering a network or sub-network also is disclosed. Sharing information about an attack in real time via secure communications, within an administrative domain and with other administrative domains, is disclosed.

It should be appreciated that the present invention can be implemented in numerous ways, including as a process, an apparatus, a system, a device, a method, or a computer readable medium such as a computer readable storage medium or a computer network wherein program instructions are sent over optical or electronic communication links. Several inventive embodiments of the present invention are described below.

A method for detecting and processing attacks on a computer network is disclosed. In one embodiment, data indicating an attack may be taking place is received. The data is placed in a queue of data to be processed. The data in the queue is processed.

These and other features and advantages of the present invention will be presented in more detail in the following detailed description and the accompanying figures, which illustrate by way of example the principles of the invention.

BRIEF DESCRIPTION OF THE DRAWINGS

The present invention will be readily understood by the following detailed description in conjunction with the accompanying drawings, wherein like reference numerals designate like structural elements, and in which.

DETAILED DESCRIPTION

A detailed description of a preferred embodiment of the invention is provided below. While the invention is described in conjunction with that preferred embodiment, it should be understood that the invention is not limited to any one embodiment. On the contrary, the scope of the invention is limited only by the appended claims and the invention encompasses numerous alternatives, modifications and equivalents. For the purpose of example, numerous specific details are set forth in the following description in order to provide a thorough understanding of the present invention. The present invention may be practiced according to the claims without some or all of these specific details. For the purpose of clarity, technical material that is known in the technical fields related to the invention has not been described in detail so that the present invention is not unnecessarily obscured.

Figure 1:
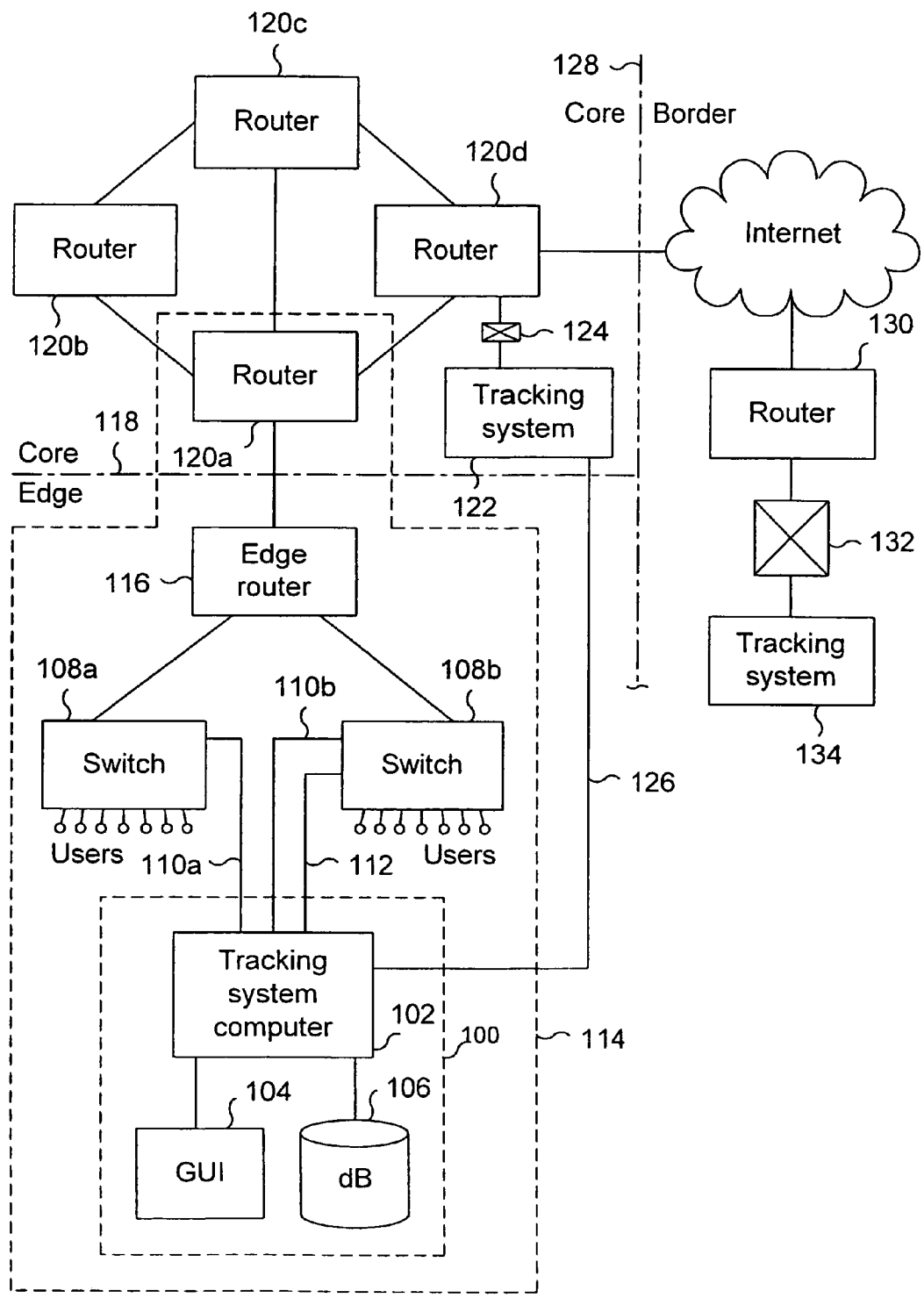
FIG. 1 is a block diagram showing an exemplary tracking system and an exemplary network environment in which such a tracking system may operate.

FIG. 1 is a block diagram showing an exemplary tracking system and an exemplary network environment in which such a tracking system may operate. The system includes a tracking system 100, which comprises a tracking system computer 102, a graphical user interface (GUI) 104, and a database 106. In one embodiment, the tracking system computer 102 performs all of the computer processing functions required for the tracking system 100. The graphical user interface 104 is used to provide information to an authorized individual responsible for the security of the computer network in which the tracking system is installed, such as a network security administrator. Graphical user interface 104 also is used to configure the tracking system, as described more fully below.

The tracking system computer 102 is connected to the respective copy port of switches 108a and 108b via the copy port connection lines 110a and 110b respectively. While the network environment illustrated in FIG. 1 contains two switches, other configurations are possible. For example, a network may include only one switch or more than two switches, depending on the needs of the particular installation, as is well known in the art. In an embodiment in which only one or more than two switches are present, the tracking system computer is connected to the copy port of each switch via a copy port connection line such as lines 110*a* and 110*b*. Tracking system computer 102 also has a network connection to switch 108*b* via network connection line 112. The network connection enables the tracking system computer to send and receive information via the network in the same manner as any other computer or other device connected to the network.

As illustrated in FIG. 1, the tracking system 100 is located in a physical location 114. In one embodiment, physical location 114 is one building that contains elements of a network that includes additional elements located in other physical locations, such as in other buildings.

Each of switches 108*a* and 108*b* is connected to an edge router 116 located in physical location 114. Edge router 116 is so named because it connects the network elements located in physical location 114 with the routers that comprise the core of the network, as described more fully below. As shown in FIG. 1 edge router 116 is on the edge side of a virtual edge border 118, which represents the interface between the network elements associated only with physical location 114, on the one hand, and network elements that comprise the core of the network on the other hand.

The edge router 116 is connected to core router 120*a*, which is in turn connected to core routers 120*b*, 120*c*, and 120*d*. Core routers 120*a*–120*d* comprise the core of the network partially illustrated in FIG. 1. Each edge router at each physical location that is part of the network would be connected to at least one of the core routers 120*a*–120*d*. The core routers provide core services, such as managing the exchange of information between network elements located at different physical locations and enabling network elements to connect to sources of information external to the network via external connections such as an Internet connection.

In the example illustrated in FIG. 1, the edge router 116 is connected to core router 120*a* which is located in the same physical location 114 as the edge router 116. It is also possible for edge router 116 to connect to a core router that is located in a different physical location than the core router 120*a*. It is also possible in certain networks for the edge router to also serve as the core router and to directly permit connections between network elements served by the router and external networks such as the Internet. This disclosure is applicable equally to networks configured in the manner described above as well as to other variations and configurations known in the art.

FIG. 1 also shows a second tracking system 122 connected via a switch 124 to core router 120*d*. Tracking system 122 is connected to tracking system computer 102 via a tracking system interconnect 126. Tracking system interconnect 126 is used by tracking system 100 and tracking system 122 to exchange information concerning the respective network elements served by each tracking system (sometimes referred to herein as the sub-network served by the tracking system) and information concerning attacks or suspected attacks on the respective network elements served by each tracking system. In one embodiment, the tracking system interconnect 126 is a logical connection across a network, such as a private network or the Internet. In one embodiment, interconnect 126 is a physical connection via a dedicated line. The second tracking system 122 is located in one embodiment in a second physical location together with core router 120*d*. The second tracking system 122 would in one embodiment provide protection for core router 120*d*, switch 124, and additional network elements, not shown in FIG. 1, located in the same physical location as tracking system 122. In one embodiment, additional tracking systems would be located in any additional physical locations that comprise the network, such as additional physical locations in which core routers 120*b* and 120*c*, and any associated network elements, may be located.

In one embodiment, a tracking system may be configured to provide protection for network elements in physical locations other than the physical location in which the tracking system is located. In such an embodiment, the tracking system would use its network connection and network management protocols to obtain information from the network elements in other physical locations.

The core routers 120*a*–102*d*, and associated elements, are located on the core side of the edge boundary 118 and the core side of the border boundary 128. The border boundary 128 marks the end of the computer network (sometimes referred to as the administrative domain) served by tracking system 100 and tracking system 122 and the beginning of network connections and other connections external to the network served by tracking systems 100 and 122. Stated another way, the border boundary 128 marks the end of the administrative domain served by tracking systems 100 and 122 and the point at which devices within the administrative domain served by tracking systems 100 and 122 are connected to networks and devices in other administrative domains.

For example, FIG. 1 shows a connection between router 120*d* in the administrative domain served by tracking systems 100 and 122 and a router 130 in a second administrative domain via the Internet. In one embodiment, the core router 120*d* has firewall functionality and the core router is connected directly to the Internet. In one embodiment, the core router is connected to the Internet through a firewall. Router 130 is connected via a switch 132 with a tracking system 134. Tracking system 134 is associated with and serves the second administrative domain. Network devices in the administrative domain served by tracking systems 100 and 122 are configured to make connections via the Internet, such as the connection to the second administrative domain illustrated in FIG. 1, through appropriate requests ultimately directed through router 120*d*.

Figure 2:
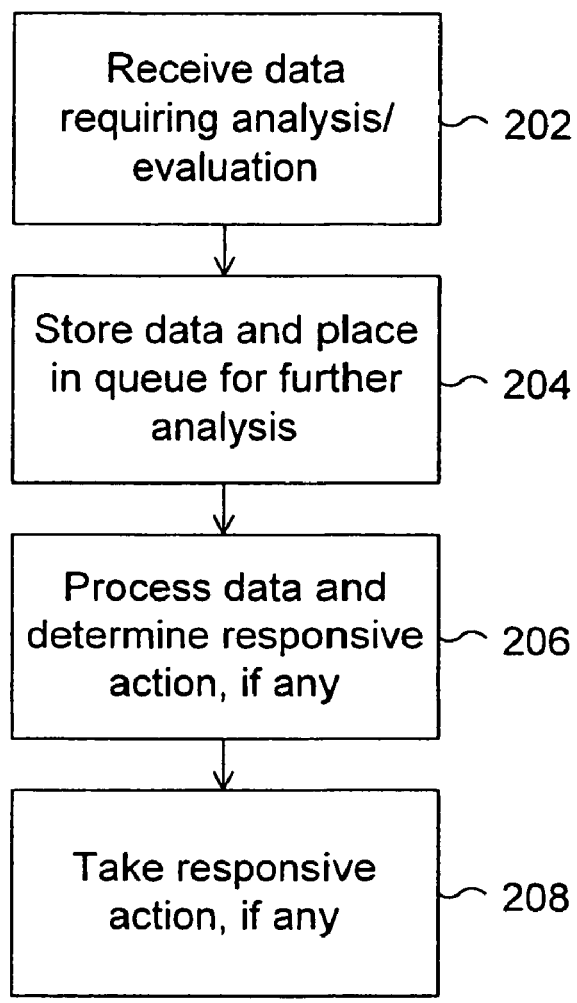
FIG. 2 is a flow chart illustrating a process used in one embodiment to detect and evaluate potential attacks on a computer network and to take appropriate responsive action.

FIG. 2 is a flow chart illustrating a process used in one embodiment to detect and evaluate potential attacks on a computer network and to take appropriate responsive action. The process begins with a step 202 in which data requiring further analysis and/or evaluation is received. In one embodiment, such data may be received from one of two sources. First, data may be received from another administrative domain external to the network concerning an attack or potential attack detected and being tracked by the other administrative domain. Such data may be received in one embodiment in one of two ways. First, an e-mail message may be received by the network security administrator, or other responsible individual, providing information concerning the attack or suspected attack being experienced by the other administrative domain. This information is then entered into the tracking system via the graphical user interface described above. Second, data may be received from another administrative domain without human intervention in the form of a message received by the tracking system via its network connection containing the information concerning the attack or suspected attack. In one embodiment, a software module operating on the tracking system computer serves as a "handoff receiver" for receiving and processing such automated messages.

The data requiring analysis and/or evaluation may also be received from a source internal to the administrative domain being served by the tracking system. In one embodiment, a "sniffer" module comprised of one or more "sniffers", described more fully below, continuously scans the data being received at various ports of various network devices. The sniffers search for data indicating an actual or suspected attack, as described more fully below, and provide information concerning suspicious data to other modules within the tracking system, as described more fully below.

The process shown in FIG. 2 continues with step 204 in which the data requiring further analysis and/or evaluation is stored and placed in a queue for further analysis by the tracking system. In step 206 the data requiring further analysis or evaluation is processed and the appropriate responsive action, if any, is determined. In step 208, the responsive action, if any, is taken.

Figure 3:
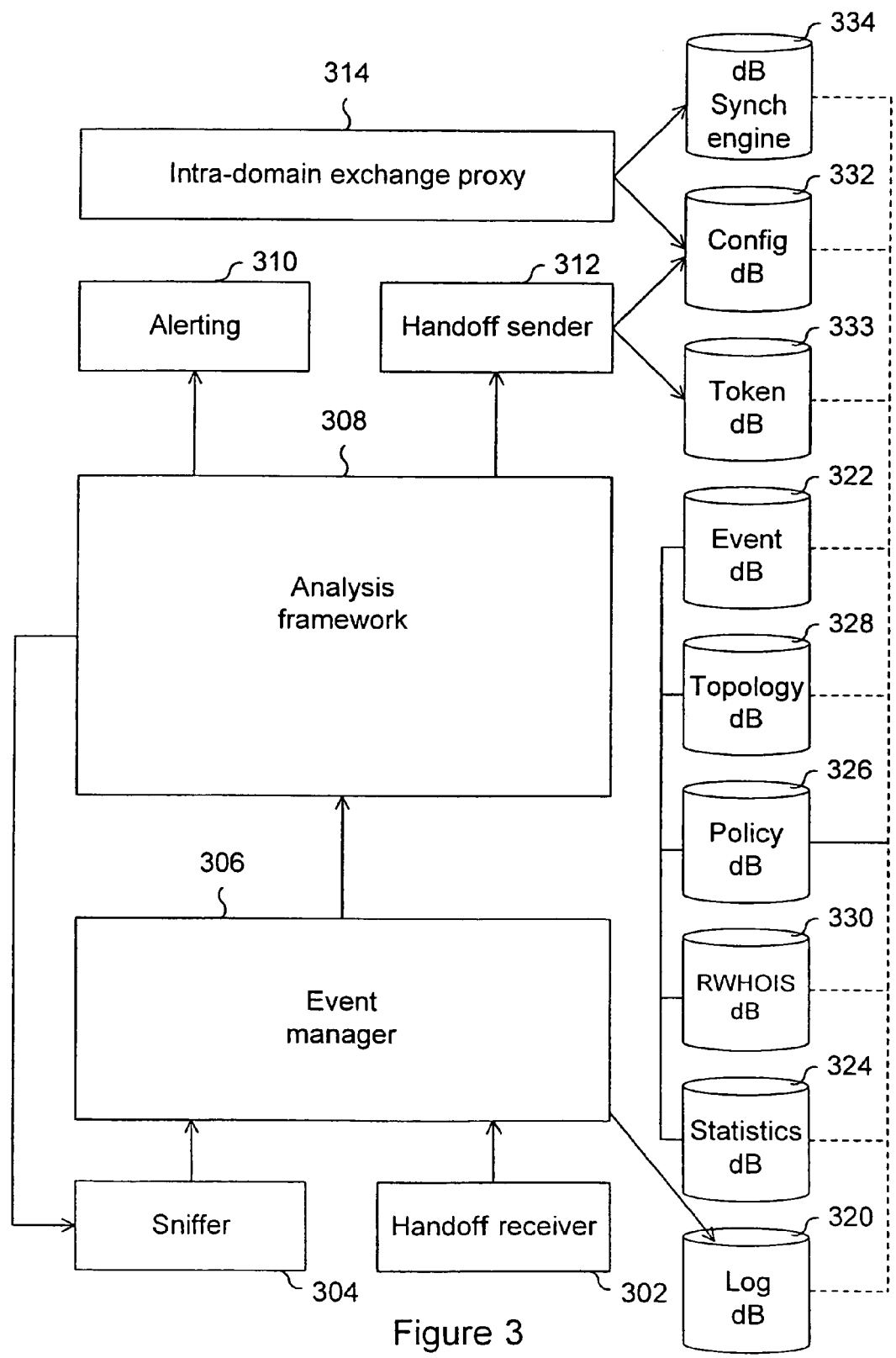
FIG. 3 is a schematic diagram illustrating the software modules implemented in one embodiment on the tracking system computer to perform the process illustrated in FIG. 2, as well as the component sub-processes described more fully below, and certain database components that comprise the tracking system database, such as the tracking system database 106 shown in FIG. 1.

FIG. 3 is a schematic diagram illustrating the software modules implemented in one embodiment on the tracking system computer to perform the process illustrated in FIG. 2, as well as the component sub-processes described more fully below, and certain database components that comprise the tracking system database, such as the tracking system database 106 shown in FIG. 1. The software modules implemented on the tracking system computer include a handoff receiver module 302. Handoff receiver module 302 receives and processes messages sent by other administrative domains to the tracking system in which the handoff receiver is included as described more fully below.

The system also includes the sniffer module 304, referred to above, which is used to monitor network traffic at the ports of devices throughout the network, one or more ports at a time, to identify messages related to a known or suspected attack or to identify messages that satisfy certain pre-configured criteria believed to indicate the likelihood or possibility that an attack is taking place. In one embodiment, each "sniffer" within the sniffer module 304 may be directed to monitor a single port at a given time. In one embodiment, the port being monitored by a sniffer may be changed dynamically.

When information related to an actual or suspected attack is received by the handoff receiver 302 or identified by the sniffer module 304, the relevant information is provided to an event manager module 306. The event manager 306 receives the suspicious data, referred to herein as "event" data, places it in a queue, and provides data to the analysis framework module 308 for processing, one event at a time, at predetermined intervals. The event manager 306 also supplies event data to the log database 320 as it is received either from the handoff receiver 302 or from the sniffer module 304. The event data stored in log database 320 may then be used for post-attack analysis or it may be shared with other tracking systems installed in the same administrative domain in which the tracking system in which the event manager 306 is located, or with tracking systems in other administrative domains, as described more fully below.

The analysis framework 308 processes event data, determines the appropriate course of responsive action, and takes the responsive action, if any. The analysis framework 308 associates the event data with an event software object, as described more fully below, and stores data relating to the event in an event database 322. The analysis framework 308 also determines whether an event is associated with an existing event or group of related events, and associates related events into a single incident software object. Events that are not related to any other events are associated with a new incident object and may be later grouped with subsequently-received event data that is related to the same incident.

One of the tools used by analysis framework 308 in determining whether an event is associated with one or more other events is a statistics database 324. The statistics database 324 stores the average incident rate of each sub-network within the network served by the tracking system and a first-order variance of the average incident rate for all networks with an above-average incident rate. The baseline incident rate and the variance are used for all networks with an average or below-average incident rate.

The analysis framework 308 also connects to a policy database 326. The policy database 326 is used to store information concerning how certain types of events and incidents should be processed by the analysis framework, including the responsive action, if any, to be taken by the analysis framework. For example, for a particular type of attack or suspected attack the policy database 326 may indicate that the attack is to be logged but otherwise ignored. For a different type of attack, the policy database 326 may indicate that an alert should be sent to a designated individual or group of individuals. In such a case, the analysis framework 308 sends a request to an alerting module 310. Alerting module 310 then sends the required alert by the appropriate means. In one embodiment, the alerting module 310 sends an e-mail message to a network security administrator advising the network security administrator of the alert condition. In one embodiment, the alerting module 310 is configured to send an alert to the network security administrator via a pager.

For certain types of events and incidents, the policy database 326 may indicate that the analysis framework 308 should track the attack back to determine the point of attack at which the messages from the attacking party are entering the network or sub-network associated with the tracking system. In such cases, the analysis framework 308 consults a topology database 328. The topology database 328 contains information concerning the devices which comprise the network or sub-network associated with the tracking system and how those devices are configured and connected to one another to form the network or sub-network associated with the tracking system. The analysis framework 308 uses this information to create a virtual map of the network. The analysis framework then uses this map to systematically track to the source of the attack to identify the point of the attack. In one embodiment, to track back the source of an attack the analysis framework 308 instructs one or more of the sniffers that comprise sniffer module 304 to systematically search ports on network devices until the point of attack has been identified, as described more fully below.

The analysis framework 308 may use information contained in messages associated with an event or incident, either alone or together with other information learned as part of the tracking back process, to identify a server or other resource that is or appears to be the source from which the network or sub-network associated with the tracking system is receiving messages associated with an attack. In such cases, the analysis framework 308 may consult the RWHOIS database 330, which is a hierarchical database of network information maintained by network registrars and network service providers. The RWHOIS database 330 supplies the identity of the entity and contact information for an individual responsible for servers and other network resources associated with other administrative domains.

The responsive action to be taken by analysis framework 308 may also include providing information about an attack or suspected attack to other administrative domains. In one embodiment, the analysis framework 308 uses handoff sender module 312 to provide information about an attack to another administrative domain. In one embodiment, the handoff sender 312 is configured to determine whether the other administrative domain has a compatible tracking system installed. In one embodiment, the handoff sender 312 consults a configuration database 332 to make this determination. In one embodiment, if the handoff sender 312 determines that the recipient administrative domain does not have a compatible tracking system, the handoff sender formulates and sends an encrypted e-mail message to an appropriate recipient in the other administrative domain to provide information concerning the attack. In one embodiment, the handoff sender sends the e-mail message to the contact person identified by the RWHOIS database 330. In one embodiment, if the handoff sender 312 determines from the configuration database 332 that the recipient administrative domain does have a compatible tracking system, the handoff sender 312 establishes communication with the tracking system in the other administrative domain via the network connection to the tracking system computer and provides information concerning the attack to the tracking system in the other administrative domain using handoff procedures described more fully below. In one embodiment, the handoff sender 312 uses resources stored in the token database 334 to establish and conduct secure communications with a compatible tracking system installed in another administrative domain, as described more fully below.

The software modules implemented on the tracking system computer 102 in the exemplary embodiment illustrated in FIG. 3 also include an intra-domain exchange proxy 314. The intra-domain exchange proxy 314 is used to manage the secure exchange of information between tracking systems installed within the same administrative domain. The intra-domain exchange proxy 314 accesses the configuration database 332 to learn the location and configuration of other tracking systems installed in the administrative domain in which the tracking system with which the intra-domain exchange proxy 314 is associated is installed. The intra-domain exchange proxy 314 also cooperates with a database synchronization engine 334. The database synchronization engine 334 provides updated information from the log database 320, statistics database 324, RWHOIS database 330, policy database 326, topology database 328, event database 322, and token database 334 to other tracking systems installed in the same administrative domain. The intra-domain exchange proxy 314 also is configured to receive information from the corresponding databases associated with other tracking systems installed within the same administrative domain as the tracking system with which the intra-domain exchange proxy 314 is associated. Analysis framework 308 is configured to access and use such information from other tracking systems to evaluate and process existing events and incidents, such as by associating event data received from another tracking system with existing event data into a single incident.

Figure 4:
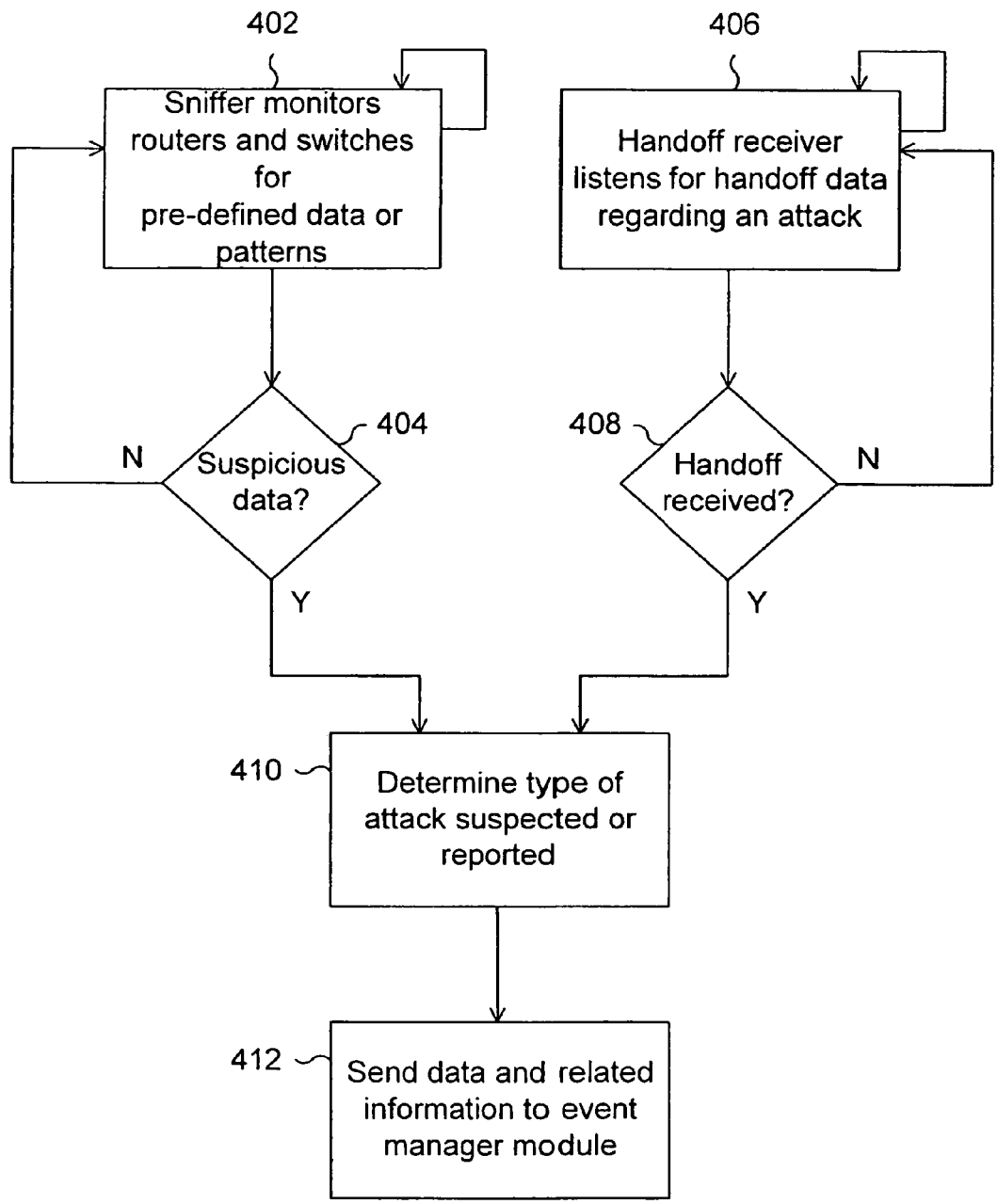
FIG. 4 is a flow chart illustrating a process used in one embodiment to receive data requiring analysis and/or evaluation, as in step 202 of the process illustrated in FIG. 2.

FIG. 4 is a flow chart illustrating a process used in one embodiment to receive data requiring analysis and/or evaluation, as in step 202 of the process illustrated in FIG. 2. One branch of the process begins in step 402 in which a sniffer monitors various ports on the router (s) and switch (es) associated with the tracking system for pre-defined data or patterns. In one embodiment, as described above with respect to FIG. 1, the tracking system computer is connected to the copy port of each switch included in the sub-network or network associated with the tracking system. The sniffer module installed on the tracking system computer is configured to instruct the switch to provide on the copy port a copy of all traffic appearing on any designated port within the switch. In one embodiment, the port designated to be copied to the copy port may be changed dynamically, enabling the sniffer to scan various ports within the switches to which it is connected by rotating through the ports on the switch. The sniffer module is also configured to monitor traffic on router ports. Because the sniffer module and tracking system do not have a direct physical connection to the router or routers associated with the tracking system, the sniffer module must employ network management protocols such as the remote monitoring protocol version 2 (RMONv2) and switch copy port implementations such as Cisco System's Switch Port Analyzer (SPAN) to obtain information about the network traffic at the various router and switch ports. In one embodiment, the switch monitoring protocol (SMON) is used to configure the switch to appropriately mirror traffic to the appropriate copy port. With respect to both switch and router traffic, the sniffer module searches a high volume of network traffic looking for any indication that an attack may be taking place. For example, the sniffer module may search for strings that match pre-defined strings considered suspicious, such as strings associated with known types of attacks or particular prior attacks.

The sniffer module may also search for other information, clues, or signatures previously associated with attacks on the network being protected or other networks. For example, the sniffer module may identify all messages sent from one of a list of suspicious source addresses, or messages attempting to access a target system within the network or sub-network associated with the tracking system via a service known to be vulnerable, such as telnet, or messages containing strings present in messages associated with prior attacks.

In one embodiment, the sniffer module also monitors switch and router ports to detect if a particular port is receiving an unusually high number of data packets of any type, a high number of data packets of a particular type, and/or a high number of packets with a certain target destination or recipient address. Such conditions may indicate that an attack is taking place, and the associated data packets would be identified by the sniffer module as suspicious. In one embodiment, statistical information from the statistics database is used to determine if the rate of certain types of messages, as described above exceeds a normal level. In one embodiment, the normal level or rate of certain types of message is programmed into the sniffer module as part of the configuration process and the sniffer module identifies as suspicious any series of data packets that exceed the rates established at the time of configuration.

Continuing with the process illustrated in FIG. 4, in step 404 the sniffer module continuously assesses whether the data being scanned is suspicious, in the sense that it indicates that an attack may be taking place. If the sniffer module has not detected any suspicious data, the process of step 402 continues until suspicious data is detected, if ever. If suspicious data is detected in step 404, the sniffer module determines in step 410 the type of attack that is suspected based on the data. In step 412 the data and any related information, for example, information concerning the type of the attack, are sent to the event manager module for processing as described further below.

The second prong of the process shown in FIG. 4 concerns the handoff receiver. In step 406 the handoff receiver listens for any handoff data received from other administrative domains. In one embodiment, handoff receiver 406 monitors a port to which another administrative domain is directed to send handoff information regarding an attack. In step 408, the handoff receiver determines whether a handoff has been received. If a handoff has not been received, the process of step 406 continues. If a handoff is received, in step 410 the handoff receiver determines the type of attack reported by the other administrative domain. In step 412, the handoff receiver 406 sends the data and other related information to the event manager module.

Figure 5:
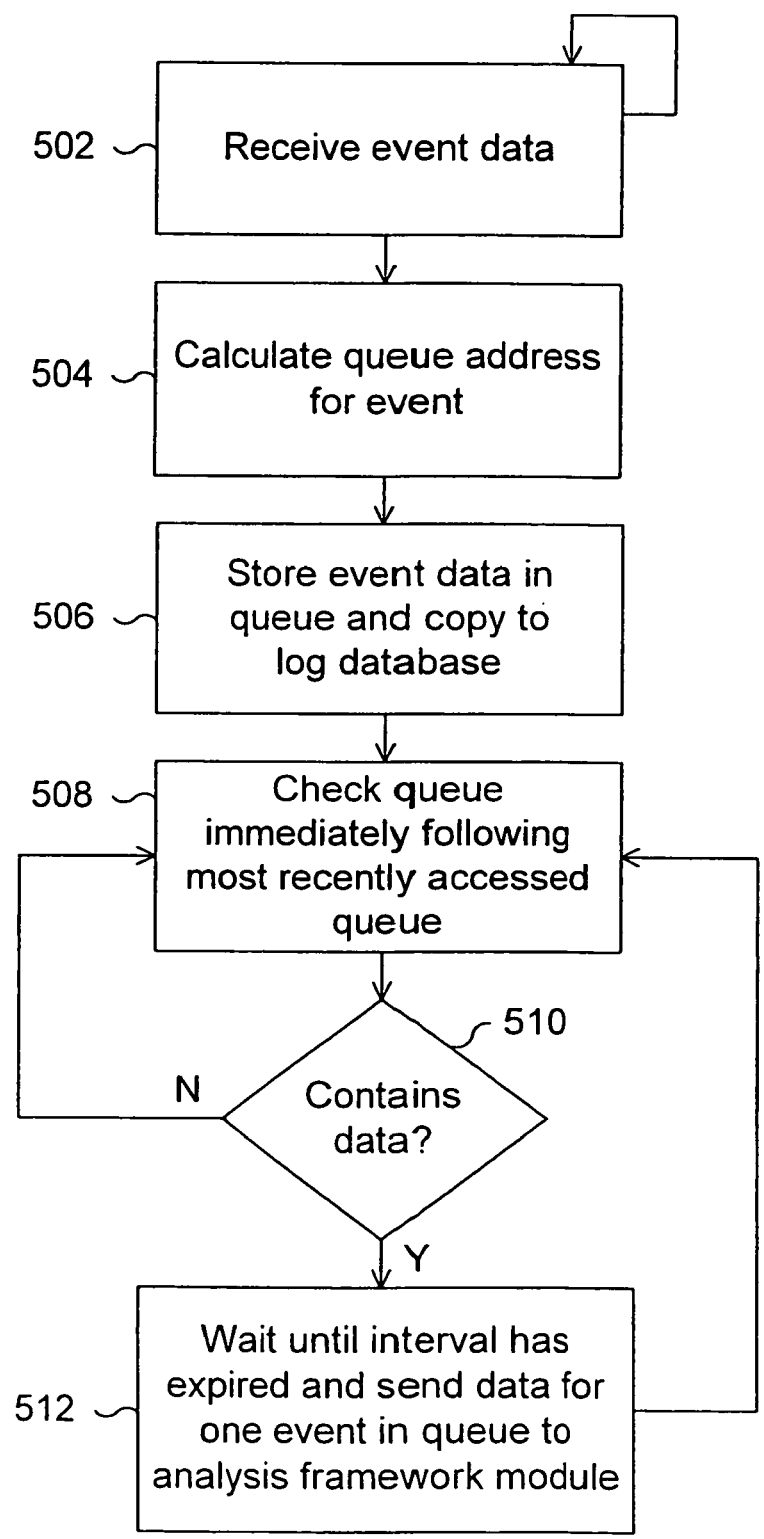
FIG. 5 is a flowchart illustrating a process used in one embodiment by the event manager module to process event data received either from the sniffer module or the handoff receiver module.

FIG. 5 is a flowchart illustrating a process used in one embodiment by the event manager module to process event data received either from the sniffer module or the handoff receiver module. The process begins in step 502 in which event data is received. The event manager module is configured in one embodiment to receive event data from the sniffer module and/or the handoff receiver module at any time, and to hold such data in a buffer until it is placed in a queue as described more fully below. In step 504 the received event data is assigned to a queue by calculating a queue address for the event. In one embodiment, the event manager maintains a table of 21 separate queues configured as three row by seven column table. In one embodiment, the row address is determined by calculating the modulus 3 (MOD 3) of the hash value of the destination address contained in the message or packet. In one embodiment, the column address is calculated by taking the modulus 7 (MOD 7) of the hash value of the entire message or packet. This process would yield a row address between 0 and 2 and a column address between 0 and 6.

Figure 6:
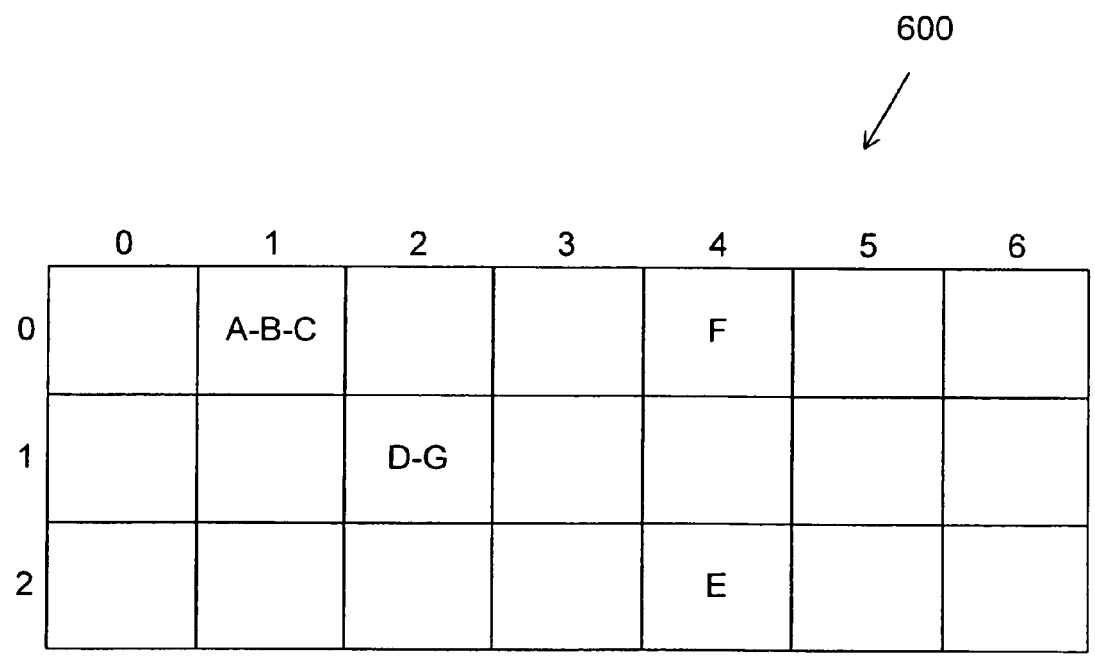
FIG. 6 illustrates a queue table 600 used in one embodiment to queue events to be sent to the analysis framework.

FIG. 6 illustrates a queue table 600 used in one embodiment to queue events to be sent to the analysis framework. The columns in table 600 are identified by a column address number between 0 and 6 and the rows are identified by a row address number between 0 and 2. Certain of the cells of table 600 contain one or more letters between A and G, each letter representing an event. For example in the queue at row 0, column 1, three events identified by the letters A, B, and C are being held. By contrast, the adjacent cell at row 0, column 2 does not contain any events in the queue associated with that cell.

Returning to FIG. 5, once a queue address has been calculated in step 504, in step 506 the event data is stored in the queue corresponding to the queue address calculated in step 504 and the event data is copied to the log database, as described above. As described above, once copied to the log database, the event data may be shared with other tracking systems installed within the same administrative domain by operation of the intra-domain exchange proxy 314 and database synchronization engine 334.

In step 508, the event manager checks the queue immediately following the most recently accessed queue in accordance with a prescribed order. In one embodiment, the order of scanning begins with the queue associated with row 0, column 0 and proceeds to the next column in numerical order in row 0 until the last column is reached, and then returns to row 1, column 0 and proceeds in increasing numerical order through the columns of row 1 until the last column of row 1 is reached, and then proceeds to row 2, column 0 and proceeds through the columns in numerical order in row 2 until the last column in row 2 is reached, after which the order of accessing returns to column 0, row 0 and continues in the manner described above. In step 510, the event manager determines if the queue associated with the row and column currently being accessed contains any event data. If the particular queue being accessed does not contain any event data at the time it is accessed, the process returns to step 508 and the next queue in order is checked. This process continues until in step 510 it is determined that the queue currently being accessed does contain event data. If it is determined in step 510 that the queue being accessed does contain event data, the process proceeds to step 512 in which the event manager waits until a prescribed interval has expired between the time the event manager last sent a set of event data to the analysis framework module and the present time (or, immediately if the time interval has already expired) and sends to the analysis framework module data for one event in the queue currently being accessed. In one embodiment, the prescribed interval is five seconds, such that the event manager module sends event data to the analysis framework module no more frequently than once every five seconds. Once the event manager module has sent data for one event to the analysis framework module in step 512, the process returns to step 508 in which the event manager checks the subsequent queue or queues, successively, as described above, until the next queue containing data is identified.

Referring once again to FIG. 6, assuming that the event manager last sent data to the analysis framework from the queue contained in row 0, column 0, the event manager would next send data to the analysis framework from row 0, column 1. Once the prescribed interval has expired, the event manager module would send data for one event, such as event A, to the analysis framework. The event manager would then check the queue at row 0, column 2, and determine that no data is contained in that queue. The event manager would then check the queue at row 0, column 3 and determine that no data was contained in that queue. The event manager would continue to the queue at row 0, column 4, find that the queue in that cell did contain data, and once the prescribed interval has passed, the event manager will send the data for event F to the analysis framework module.

In this manner, multiple copies of the same suspicious message, such as may be the case with events A, B, and C in the queue associated with row 0 and column 1, could not successfully be used by an attacker to mask from detection a potentially more threatening suspicious message, such as one associated with event F in the queue associated with row 0, column 4, by requiring the system to process multiple copies of the same message before being able to process the more threatening message. Because of the way in which the row and column addresses are calculated, multiple copies of the same message would be placed in the same queue because the hash of the total message and the hash of the destination address would be the same for each message. Similarly, different messages sent to the same destination may appear in different columns, but would be in the same row, because they would have the same destination address, which determines the row address. For example, in the example shown in FIG. 6, event A, B, and C may be the same message, and event F may be a different message sent to the same destination. One strategy that an attacker might attempt would be to send massive numbers of copies of a suspicious but relatively innocuous message in the hope of overloading the security systems in place on the target network and then to send a more potentially dangerous message to the same destination with the hope that the more dangerous message would escape detection and analysis by the by then overloaded security systems. The approach described above would prevent such a strategy from being successful because only the first message of the series of identical messages would be analyzed before a message from other queues would be sent to the analysis framework for analysis.

The event manager module thus meters the amount of data and the rate at which data is provided to the analysis framework for more computationally intensive analysis, thereby conserving the resources of the analysis framework module and the tracking system computer on which it is running, and determines the order in which event data will be sent to the analysis framework in such a way that messages to a particular destination and/or multiple copies of the same message would not either intentionally or coincidentally mask from detection and analysis a different message, such as a message to a different destination, that may present a more serious threat to the security of the network or sub-network being protected by the tracking system.

Figure 7:
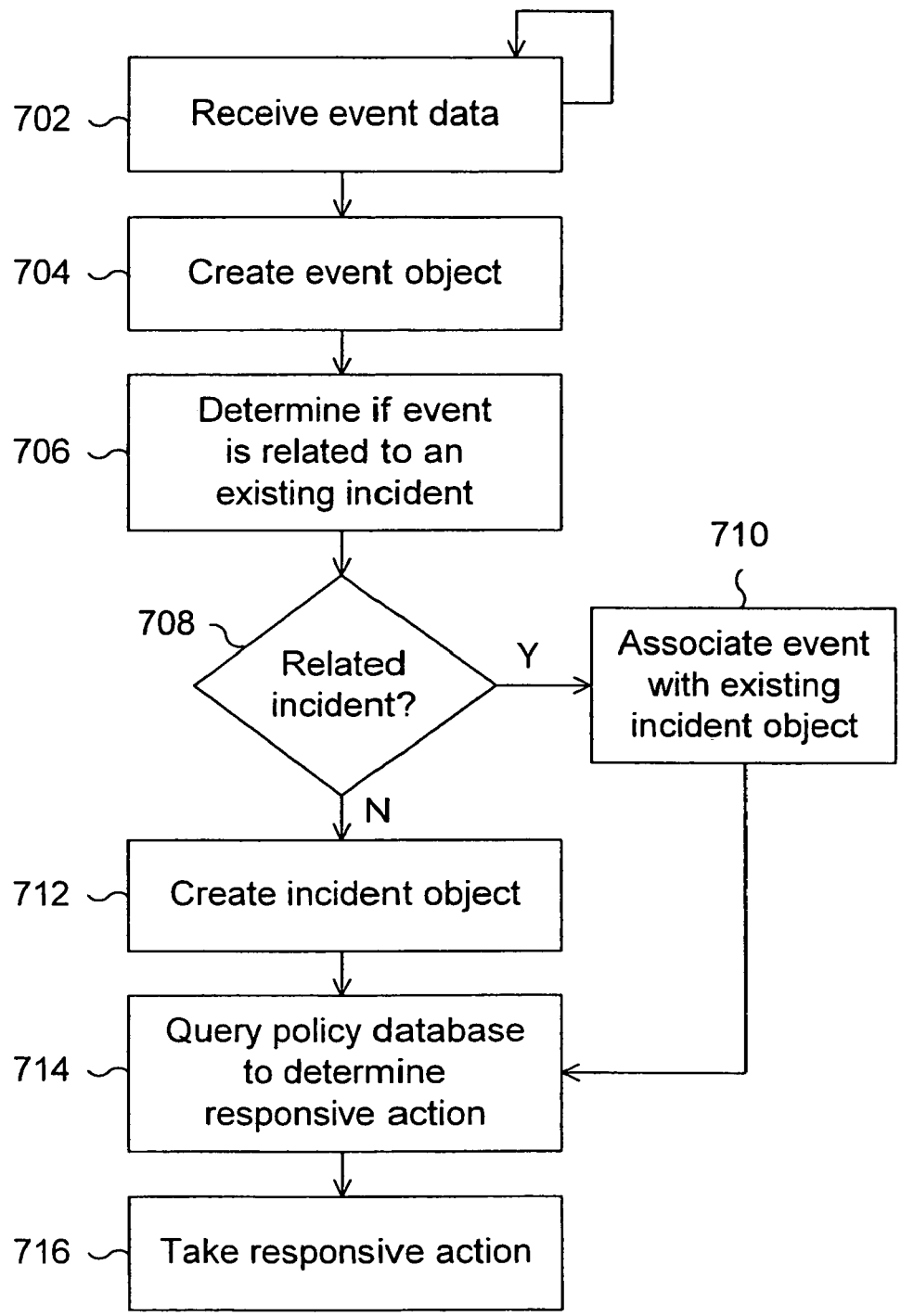
FIG. 7 is a flowchart illustrating a process used in one embodiment by the analysis framework module to process event data, as in step 206 of FIG. 2.

FIG. 7 is a flowchart illustrating a process used in one embodiment by the analysis framework module to process event data, as in step 206 of FIG. 2. The process begins in step 702 in which event data is received from the event manager module, in the manner described above. In step 704 an event software object is created for the event. The event software object is configured to store the event data and related data, and to perform certain functions and processes either on or with respect to the event data. In one embodiment, the event object is an instance of a software object created using an object oriented programming language such as JAVA. In one embodiment, a programming language other than an object oriented programming language is used to accomplish the tasks performed by the event object. In step 706, the analysis framework determines whether the event is related to an existing incident. Indications that an event is related to an existing incident may include information such as the fact that the message or packet associated with the event comes from the same source address as other events received previously and associated with an existing incident. As noted above, events may be aggregated into an existing incident based on similarities in the type of message and/or the target or destination address, or the presence of other strings or information indicating that the events are related. Also as described above, events that do not bear similarities on their face may be aggregated into a single incident if the messages associated with the events were received close in time in the same network or sub-network such that the event rate for that period of time exceeds by a prescribed amount the average event rate for that particular network or sub-network, or for networks or sub-networks of the same type as the affected network or sub-network.

If it is determined in step 708 that an event is related to an existing incident, in step 710 the event object is associated with an existing incident object, which incident object may have one or more other event objects associated with it. If it is determined in step 708 that the event is not related to any existing incident, the process proceeds to step 712 in which a new incident object is created and the event object for the event is associated with the new incident object. In one embodiment, the event object is one of a plurality of types of event object each designed to perform different functions with respect to a different type of event. In one embodiment, the incident object with which an event object is associated is one of a plurality of types of incident object wherein each type of incident object is tailored to process a different type of attack. In one embodiment, the sniffer module determines the type of suspected attack based on the criteria used to identify a message or packet as being suspicious and provides along with the event data an indication of the type of attack suspected.

Referring further to FIG. 7, once an event has either been associated with an existing incident object in step 710 or associated with a new incident object in step 712, in step 714 the policy database is queried to determine the appropriate responsive action for the incident. In one embodiment, the responsive action is dictated by the incident type. In one embodiment, the responsive action is dictated by other characteristics of the incident, such as the source address, target address, targeted service (e.g. telnet), the network or sub-network affected, the presence of pre-defined strings in the messages or packets associated with the incident, and/or any combination of the preceding characteristics. In one embodiment, the responsive action to be taken for various types of incident or for incidents having specified characteristics is determined at the time the tracking system is configured. In one embodiment, the responsive action to be taken for various types of incident may be set or modified by means of the graphical user interface.

In step 716, the analysis framework module takes the responsive action determined in step 714 to be appropriate. In one embodiment, as described above, the responsive action for one or more types of incident may include sending an alert, such as by activating a pager and/or sending an e-mail message to alert a network security administrator to the fact that an alert condition is present, or sending an appropriate message to a router or switch to stop a malicious flow of network traffic. As described above, the responsive action may also include providing information regarding the incident to other tracking systems installed in the same administrative domain as the tracking system processing the incident. Also as described above, the responsive action may include tracking the source of the attack to determine the point of the attack at which the attack is entering the network or sub-network associated with the tracking system, as referred to above and described more fully below. The responsive action may also include, as described above and explained more fully below, handing the information concerning the attack with which the incident is associated off to another administrative domain, either through an e-mail message to a party responsible for system administration and/or security for the other administrative domain, or if the other administrative domain has a compatible tracking system installed, the tracking system may be configured to send a handoff message to the tracking system installed in the other administrative domain, either directly or through an intermediary, as described more fully below.

Figure 8:
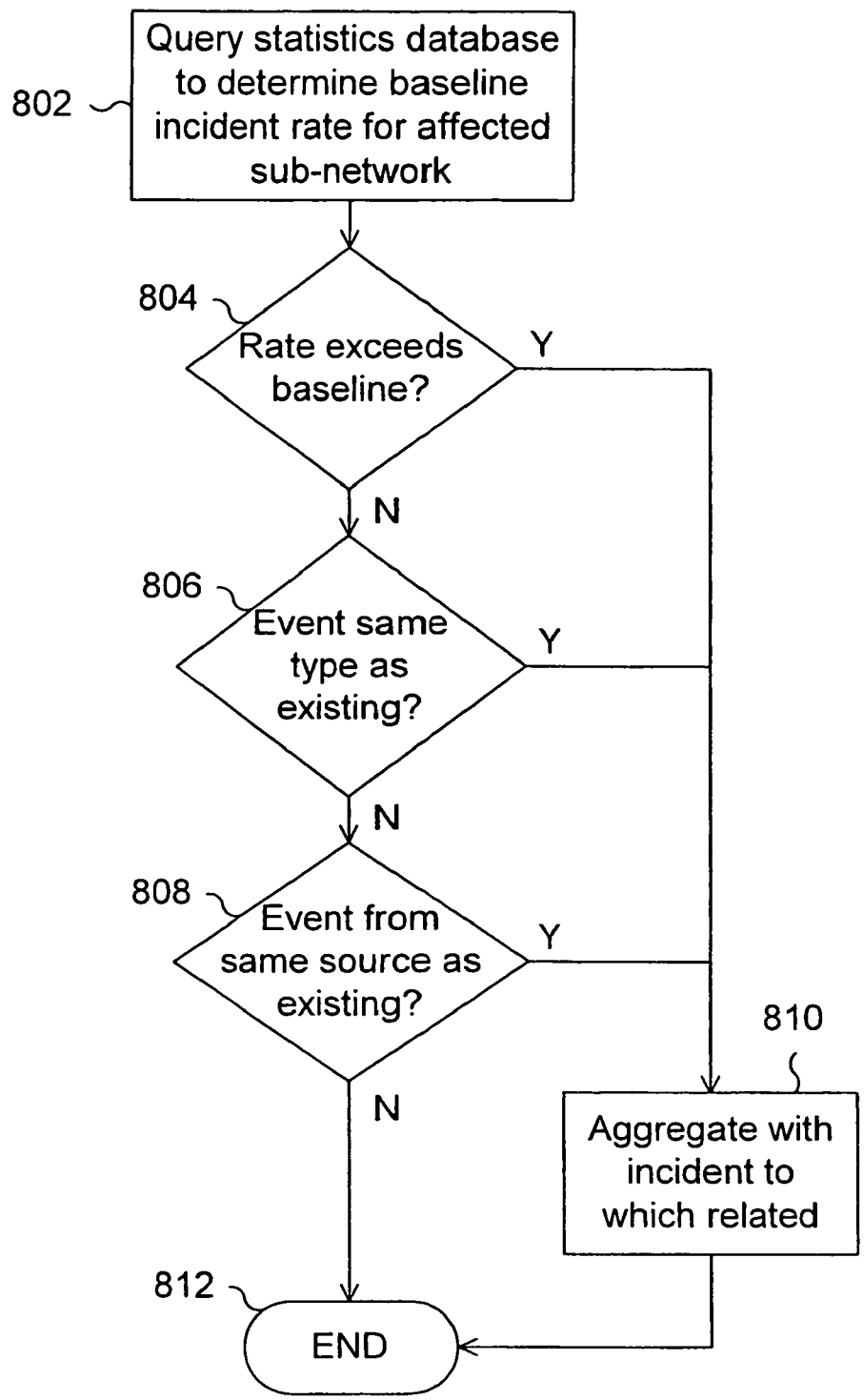
FIG. 8 is a flowchart illustrating a process used in one embodiment to determine if an event is related to an existing incident, as in step 706 of FIG. 7.

FIG. 8 is a flowchart illustrating a process used in one embodiment to determine if an event is related to an existing incident, as in step 706 of FIG. 7. The process begins with step 802 in which the statistics database is queried to determine a baseline incident rate for the affected network or sub-network. In step 804 it is determined whether the number of events currently associated with the network or sub-network being affected by the event under consideration exceeds the baseline incident rate by a prescribed amount. In one embodiment, the prescribed amount is the baseline rate plus two standard deviations from the baseline. If it is determined in step 804 that the number of incidents affecting the network or sub-network affected by the event under consideration exceeds the baseline by the prescribed amount, the process proceeds to step 810 in which the event under consideration is aggregated with one or more other events affecting affected network or sub-network into a single related incident. If it is determined in step 804 that the current number of incidents affecting the network or sub-network affected by the event under consideration does not exceed the baseline incident rate by the prescribed amount, the process continues with step 806 in which it is determined whether the event under consideration is the same type of attack as an existing incident. If it is determined in step 806 that the event is the same type as an existing incident, the process proceeds to step 810 in which the event under consideration is aggregated with the existing incident of which it is the same type. If it is determined in step 806 that the event under consideration is not the same type as any existing incident, the process continues with step 808 in which it is determined whether the event under consideration is associated with messages or packets from the same source address as the messages or packets associated with an existing incident. If it is determined in step 808 that the event under consideration is associated with a message or packet from the same source address as an existing incident, the process proceeds to step 810 in which the event under consideration is aggregated with the incident associated with messages or packets from the same source address as the event under consideration. If it is determined in step 808 that the event under consideration is not associated with messages or packets from the same source address as an existing incident, the process ends in step 812 and the event under consideration is not aggregated or associated with an existing incident.

Figure 9:
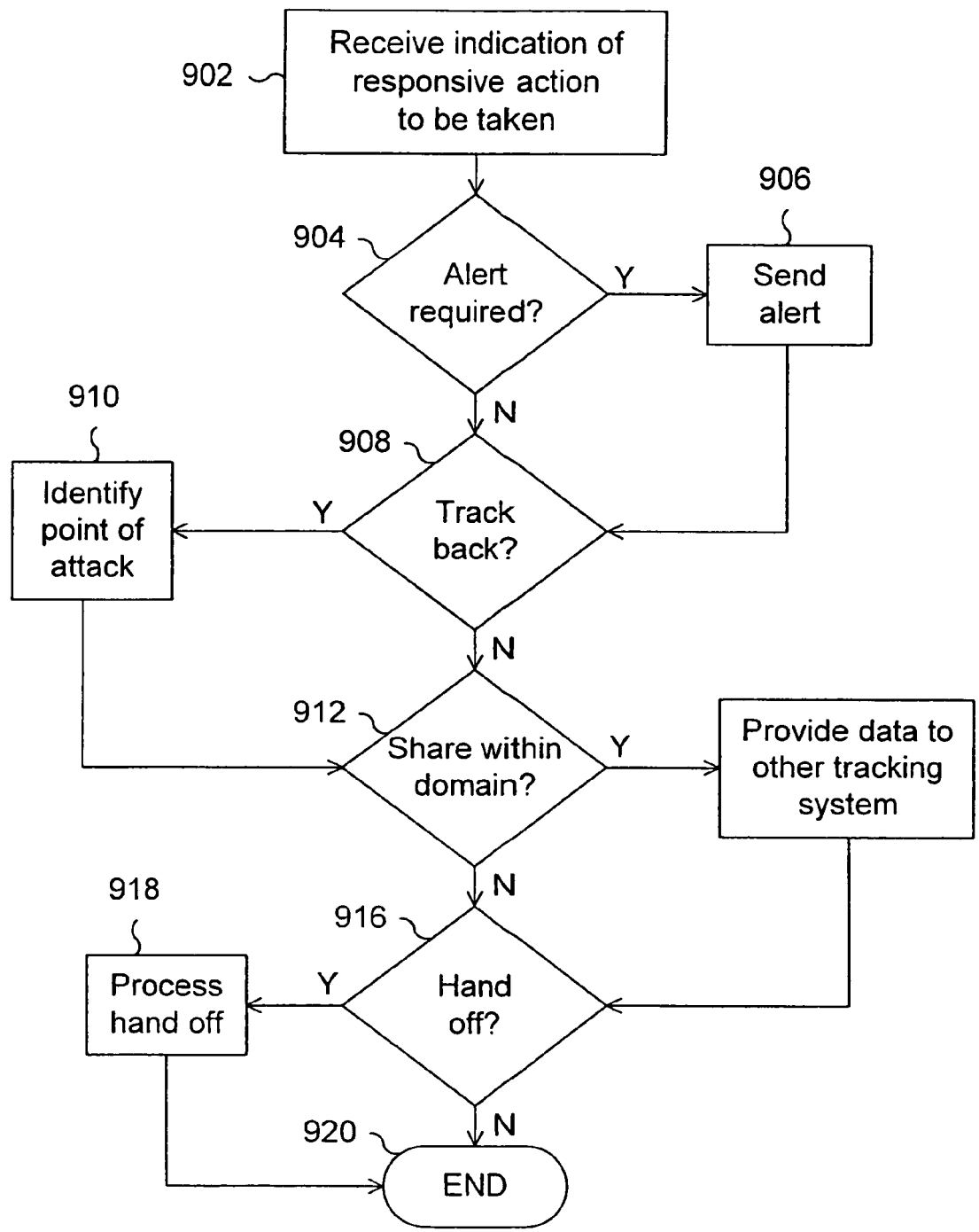
FIG. 9 is a flowchart illustrating a process used in one embodiment by the analysis framework to take the appropriate responsive action with respect to an incident.

FIG. 9 is a flowchart illustrating a process used in one embodiment by the analysis framework to take the appropriate responsive action with respect to an incident. The process begins with step 902 in which an indication of the responsive action to be taken is received. As described above, in one embodiment the analysis framework queries the policy database to determine the appropriate responsive action. In step 904 it is determined if the responsive action to be taken includes sending an alert. If the responsive action does include sending an alert, the process proceeds to step 906 in which an alert is sent. As described above, the alert may take the form of activating a pager to inform a responsible individual that an alert condition is present. In one embodiment, the alert may take the form of an e-mail message sent to a responsible individual. Other types of alerts and combinations of types of alerts are possible.

Once an alert has been sent in step 906, or it is determined in step 904 that an alert is not required as part of the responsive action, it is determined in step 908 whether the responsive action to be taken includes tracking the attack back to the point of attack at which the attack entered the network or sub-network associated with the tracking system. If it is determined in step 908 that tracking the source of the attack is part of the responsive action to be taken, the process proceeds to step 910 in which the point of attack is identified.

Once the point of attack has been identified in 910, or if it is determined in step 908 that tracking the source of the attack is not part of the responsive action to be taken, the process proceeds to step 912 in which it is determined whether the responsive action to be taken includes sharing information concerning the attack with other tracking systems in the same administrative domain as the tracking system processing the incident. If it is determined in step 912 that the responsive action to be taken includes sharing information concerning the attack with other tracking systems in the same administrative domain, the process proceeds to step 914 in which data concerning the attack is provided to other tracking systems in the same administrative domain as the tracking system processing the incident, using in one embodiment one of the communication protocols described below.

Once data concerning an attack has been provided to other tracking systems in the same administrative domain in step 914, or if it is determined in step 912 that the responsive action to be taken does not include sharing information about the attack with other tracking systems in the same administrative domain, the process proceeds to step 916 in which it is determined whether the responsive action includes sending a handoff message to another administrative domain concerning the attack. If it is determined in step 916 that data concerning the attack should be handed off to another administrative domain, the process proceeds to step 918 in which the handoff is processed and sent. As noted above, the handoff may take the form of an e-mail message sent to an appropriate individual at the other administrative domain. If the other administrative domain has a compatible tracking system installed, and the tracking system processing the incident has the necessary information concerning the compatible tracking system installed at the other administrative domain, the handoff may take the form of an automated handoff message sent by the tracking system to the compatible tracking system installed at the other administrative domain. Such a handoff message may either be sent directly from the tracking system processing the incident to the compatible tracking system in the other administrative domain, or the handoff message may be sent through a trusted third party intermediary configured to receive the handoff message and pass it on to the other administrative domain. In one embodiment, the tracking system processing the incident may request that the trusted third party intermediary forward information concerning the attack to the other administrative domain anonymously, i.e., without identifying the source administrative domain or information about the network or tracking system of the source administrative domain. Once a handoff has been processed and sent in step 918, or if it is determined in step 916 that no handoff to another administrative domain is required, the process ends in step 920.

Figure 10:
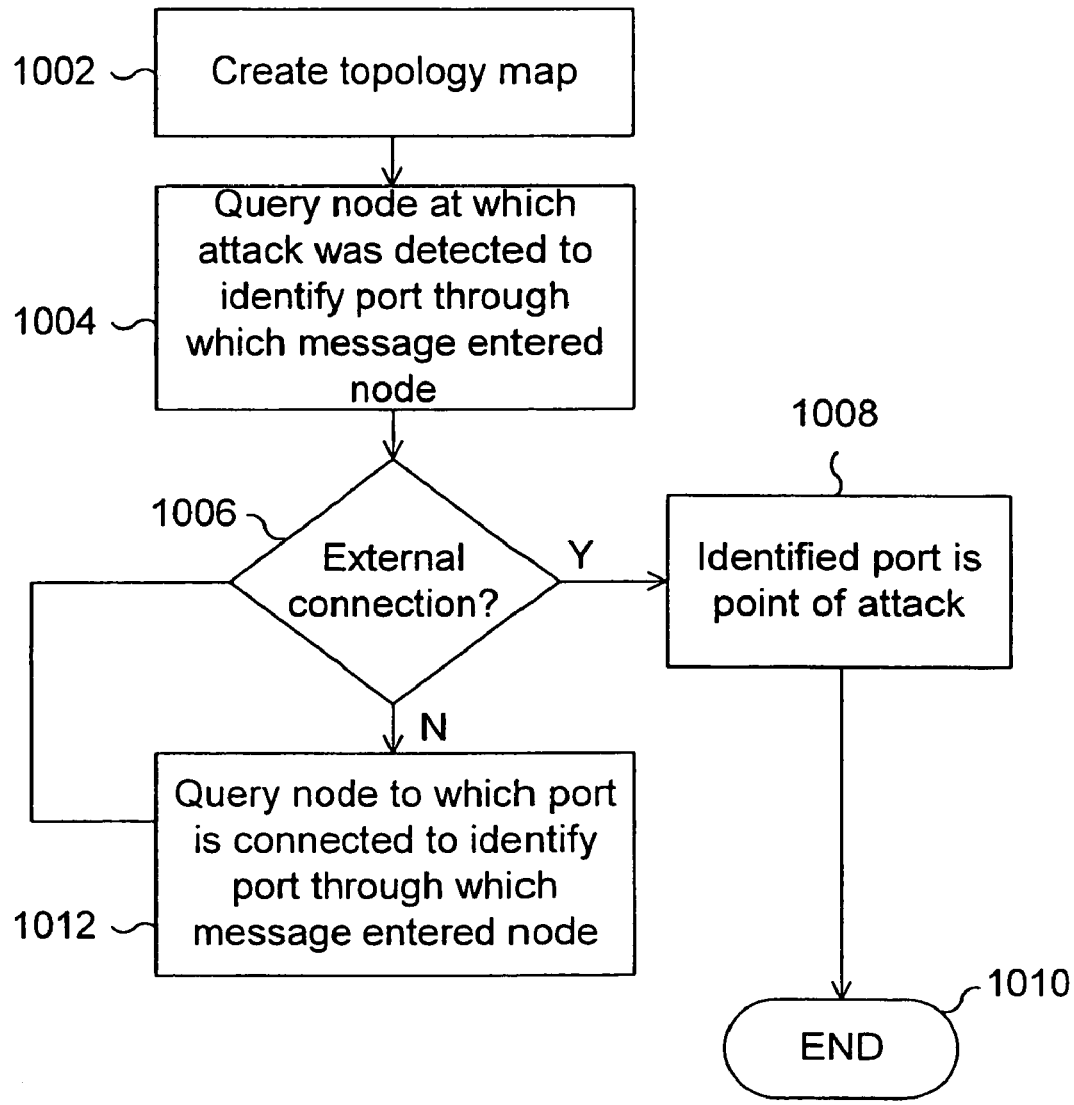
FIG. 10 is a flowchart illustrating a process used in one embodiment to track the source of an attack to determine the point of attack at which it is entering the network or sub-network associated with the tracking system, as in step 910 of FIG. 9.

FIG. 10 is a flowchart illustrating a process used in one embodiment to track the source of an attack to determine the point of attack at which it is entering the network or sub-network associated with the tracking system, as in step 910 of FIG. 9. The process begins with step 1002 in which a network topology map is created. As described above, in one embodiment the analysis framework module queries the topology database to create a map representing the devices that comprise the network or sub-network associated with the tracking system and the configuration and interconnections of each device. In step 1004, the analysis framework directs one of the sniffers that comprise the sniffer module to query each port at the node at which the attack was detected to identify the port at that node through which packets or messages associated with the attack are entering that node. For example, referring to FIG. 1 above, if an attack was first detected by a message detected in switch 108a, the tracking system, which as described above contains a connection to the copy port of switch 108a, would use the copy port to scan all of the other ports of switch 108a, by operation of one of the sniffers that comprise the sniffer module. Once the port through which messages associated with the attack are entering the node at which the attack was first detected has been identified in step 1004, the process proceeds to step 1006 in which it is determined whether the port through which messages are entering that node is an external connection to another administrative domain or to a part of the network not associated with the tracking system processing the incident. In one embodiment, the topology map described above is used to make this determination. In the example described above, for example, it may be determined in step 1004 that the node at which the messages associated with the attack are entering switch 108*a* is the port connected with the edge router 116. In that case, it would be determined in step 1006 that the port through which the messages associated with the attack are entering the switch 108*a* is not an external connection.

If it is determined in step 1006 that the port through which messages associated with the attack are entering the node being analyzed is an external connection, the process proceeds to step 1008 in which the identified port is determined to be the point of attack, in which case the process ends at step 1010. If it determined in step 1006 that the port through which messages associated with the attack are entering the node under analysis is not an external connection, the process proceeds to step 1012 in which the node to which that port is connected is queried to identify the port in the latter node through which messages associated with the attack are entering that node. Continuing with the example described above, in step 1012 the ports of edge router 116 would be queried to determine the port through which messages associated with the attack were entering the edge router 116.

Once the port through which messages associated with the attack are entering the node currently under consideration in step 1012 is identified, the process returns to step 1006 in which it is determined whether that port through which messages associated with the attack are entering the node is an external connection. If the port is an external connection, the process continues with steps 1008 and 1010 as described above. If the connection is not an external connection, the process returns to step 1012 with respect to the upstream node connected to the port identified as the port through which messages associated with the attack are entering the downstream node. Successive iterations of steps 1006 and 1012 are completed until the source of the attack is tracked back to an external connection.

If the external connection identified through the process illustrated in FIG. 10, for example, is an external connection to another sub-network which is within the same administrative domain as the sub-network or network associated with the tracking system processing the incident, but which is not itself associated with the tracking system processing the incident and instead is associated with a second tracking system within the same administrative domain, in one embodiment the tracking back of the source of the attack may be continued by the second tracking system. The protocols used to exchange such information between the tracking systems are described below. If the external connection identified by the process illustrated in FIG. 10 is a connection external to the administrative domain, a handoff message concerning the attack may be sent to the administrative domain identified as the source of the attack, if the policy database indicates that such a handoff is included in the responsive action to be taken with respect to the attack.

It should be noted that the responsive action to be taken may not depend solely upon information known at the time the incident is first evaluated. Instead, as additional information is gathered, further or different responsive action may be required. For example, for a particular type of incident, the initial responsive action may be limited to sending an alert to the system security administrator. However, if additional events associated with the same incident are subsequently identified, the policy database may require that further action be taken, such as tracking the source of the attack and/or exchanging information about the attack either with other tracking systems installed within the same administrative domain or with other administrative domains.

Figure 11A:
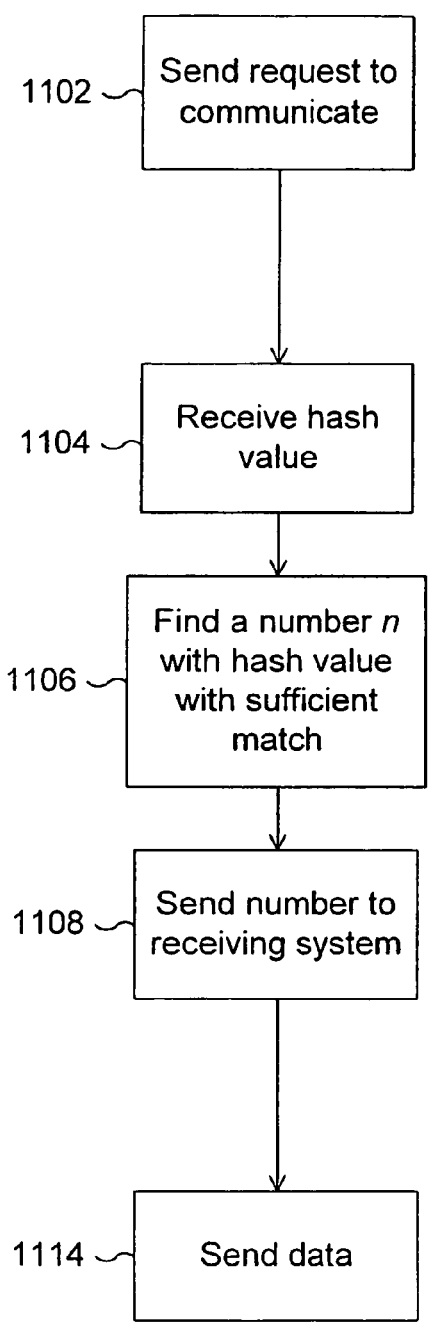
FIG. 11A is a flowchart illustrating a process used in one embodiment by a tracking system seeking to establish communication with another tracking system within the same administrative domain from the perspective of the sending system.
Figure 11B:
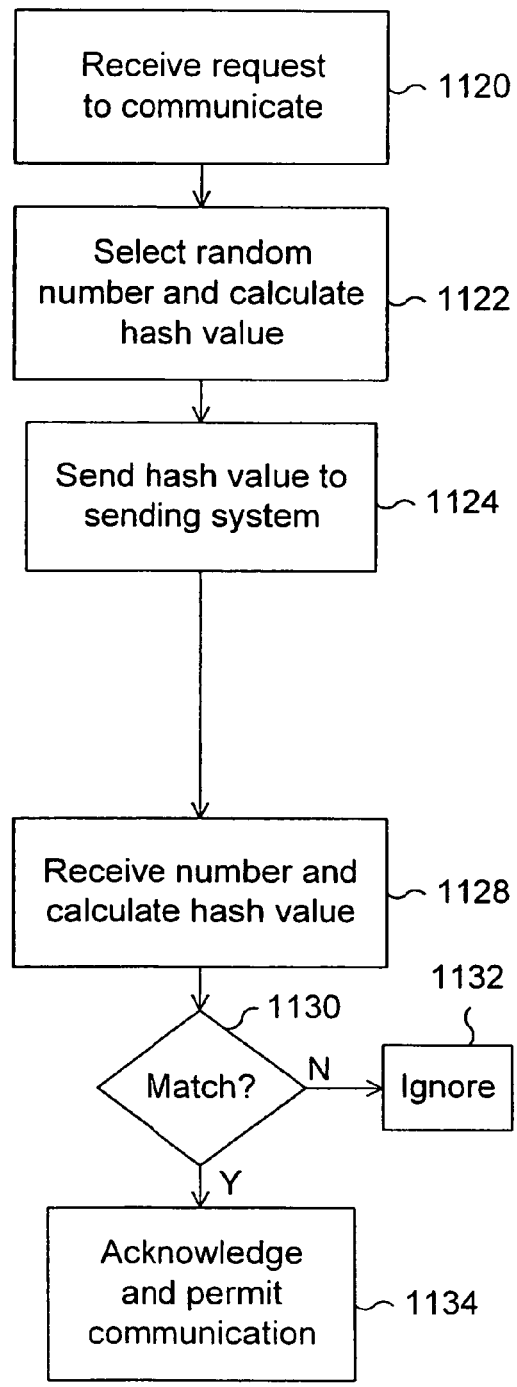
FIG. 11B is a flowchart illustrating a process used in one embodiment to process a request received by a tracking system to communicate via a port used to communicate with other tracking systems within the same administrative domain, from the perspective of the tracking system that receives the request to communicate.

FIG. 11A is a flowchart illustrating a process used in one embodiment by a tracking system seeking to establish communication with another tracking system within the same administrative domain from the perspective of the sending system. FIG. 11B is a flowchart illustrating a process used in one embodiment to process a request received by a tracking system to communicate via a port used to communicate with other tracking systems within the same administrative domain, from the perspective of the tracking system that receives the request to communicate. FIGS. 11A and 11B will be discussed in parallel. One advantage of the communication protocol illustrated in FIGS. 11A and 11B, as described more fully below, is its ability to defeat certain types of attacks that might otherwise jeopardize one or the other of the tracking systems, including particularly the denial of service type of attack, whereby an attacker attempts to require a target system to process more information than it is able to process with the result that the target system becomes unavailable for its intended and authorized uses.

The process shown in FIG. 11A begins with step 1102 in which a tracking system seeking to send information to another tracking system within the same administrative domain sends a request to communicate to the receiving tracking system. The tracking system sending the request and performing the other steps of the process shown in FIG. 11A will be referred to herein as the sending system. The tracking system that receives the request to communicate sent by the sending system and that performs the process steps illustrated in FIG. 11B will be referred to herein as the receiving system.

Referring to FIG. 11B, the process begins with step 1120 in which the receiving system receives the request to communicate sent by the sending system. In step 1122, the receiving system selects a random number and calculates a hash value for the number using a predetermined cryptographic hash function. In step 1124, the receiving system sends the hash value to the sending system.

Referring to FIG. 11A, in step 1104 the sending system receives the hash value sent by the receiving system. In step 1106 the sending system searches for and finds a number n, the hash value of which provides a sufficient match with the hash value received from the receiving system. In one embodiment, the cryptographic hash function outputs a hash value having 160 bits. In one embodiment, a sufficient match is found if at least the first 20 bits of the hash value of the number n match the corresponding bits in the hash value received from the receiving system. In step 1108, the sending system sends the number n to the receiving system.

Referring further to FIG. 11B, in step 1128 the receiving system receives the number n sent by the sending system and calculates the hash value for the number n. In step 1130, the receiving system determines whether the hash value for the number n matches the hash value of the random number, which hash value was sent previously to the sending system. As described above, in one embodiment the receiving system determines in step 1130 whether at least the first 20 bits of the hash value of the number n received from the sending system match the corresponding bits of the hash value of the random number originally sent to the sending system by the receiving system. If it is determined in step 1130 that a sufficient match is not present, the process of FIG. 11B proceeds to step 1132 in which the request to communicate is ignored by the receiving system. If it is determined in step 1130 that a sufficient match is present, the process of FIG. 11B proceeds to step 1134 in which the receiving system acknowledges the request to communicate and permits communication.

Referring further to FIG. 11A, the process continues with step 1114 in which an indication is received by the sending system that the receiving system will permit the communication and the sending system sends to the receiving system the data the sending system desired to send.

The communication protocol described above is advantageous because it enables the system that receives a request to communicate to determine that the requesting system is a system authorized to communicate with it by performing just a couple of non-computationally-intensive operations. The system that received the request to communicate need only find a random number, calculate a hash value, send the hash value to the requesting party, and then determine the hash value of a number receive din response to the hash value sent to the requesting party and insure there is an adequate match. By contrast, the requesting system must perform the computationally intensive task of finding a number that will yield a cryptographic hash value that matches the cryptographic hash value received from the system with which it wishes to communicate. As a result, even if an unauthorized party somehow obtained the information concerning the cryptographic hash function being used in the communication protocol, which is of a type sometimes called a hand shake, the would be attacker would be limited by the computing power of the attacker's system to making only a limited number of successful communications to the target tracking system. For example, a typical system may be able to successfully send approximately 15 packets per minute to a target system using the above protocol. This number of packets would not be sufficient to affect a successful denial of service attack on a typical tracking system computer.

In addition to this strong protection against this denial of service attacks the communication protocol described above protects the tracking systems from other types of attacks by requiring that the would be attacker both know the communication protocol and have the cryptographic hash function being used as part of the communication protocol in the tracking systems installed in the particular administrative domain.

Figure 11C:
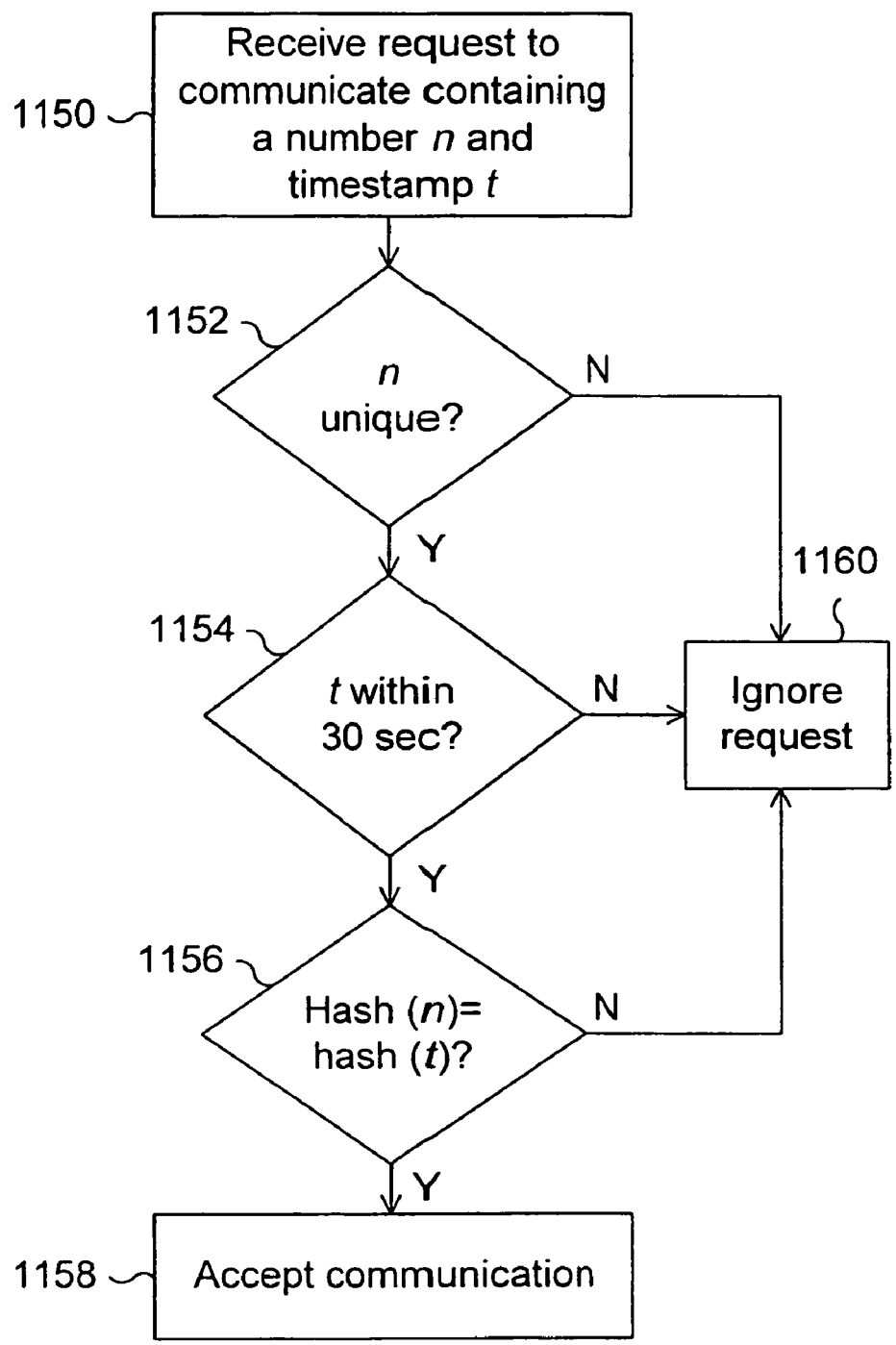
FIG. 11C illustrates an alternative communication protocol used in one embodiment to establish communication between a sending tracking system and a receiving tracking system.

FIG. 11C illustrates an alternative communication protocol used in one embodiment to establish communication between a sending tracking system and a receiving tracking system. The process begins with step 1150 in which the receiving tracking system receives a request to communicate which request includes a number n and a time stamp t. In step 1152 the receiving tracking system determines whether the number n is unique by determining whether the same number has been sent to the tracking system in a prior request to communicate. If it is determined in step 1152 that the number n is not unique, the process proceeds to step 1160 in which the request to communicate is ignored. If it is determined in step 1152 that the number n is unique, the process proceeds to step 1154 in which it is determined whether the time stamp t is within 30 seconds of the current time. If it is determined in step 1154 that the time stamp t is not within 30 seconds of the current time, the process proceeds to step 1160 in which the request to communicate is ignored. If it is determined in step 1154 that the time stamp t is within 30 seconds of the present time, the process proceeds to step 1156 in which it is determined whether the cryptographic hash function value of the number n matches the cryptographic hash function value of the time stamp t within the required parameters. In one embodiment, as described above, it is determined that the cryptographic hash function values are a satisfactory match if at least the first 20 bits of each cryptographic hash function value are the same as the corresponding bits in the other cryptographic hash function value. If it is determined in step 1156 that the cryptographic hash function value of the number n matches the cryptographic hash function value of the time stamp sufficiently, the communication is accepted in step 1158. If it is instead determined in step 1156 that the cryptographic hash function value of the number n does not match the cryptographic hash function value of the time stamp sufficiently, the process proceeds to step 1160 in which the request to communicate is ignored. The protocol thus forces an attacker to spend considerably greater resources than the tracking system computer in order to successfully send a message to the tracking system computer.

Figure 12:
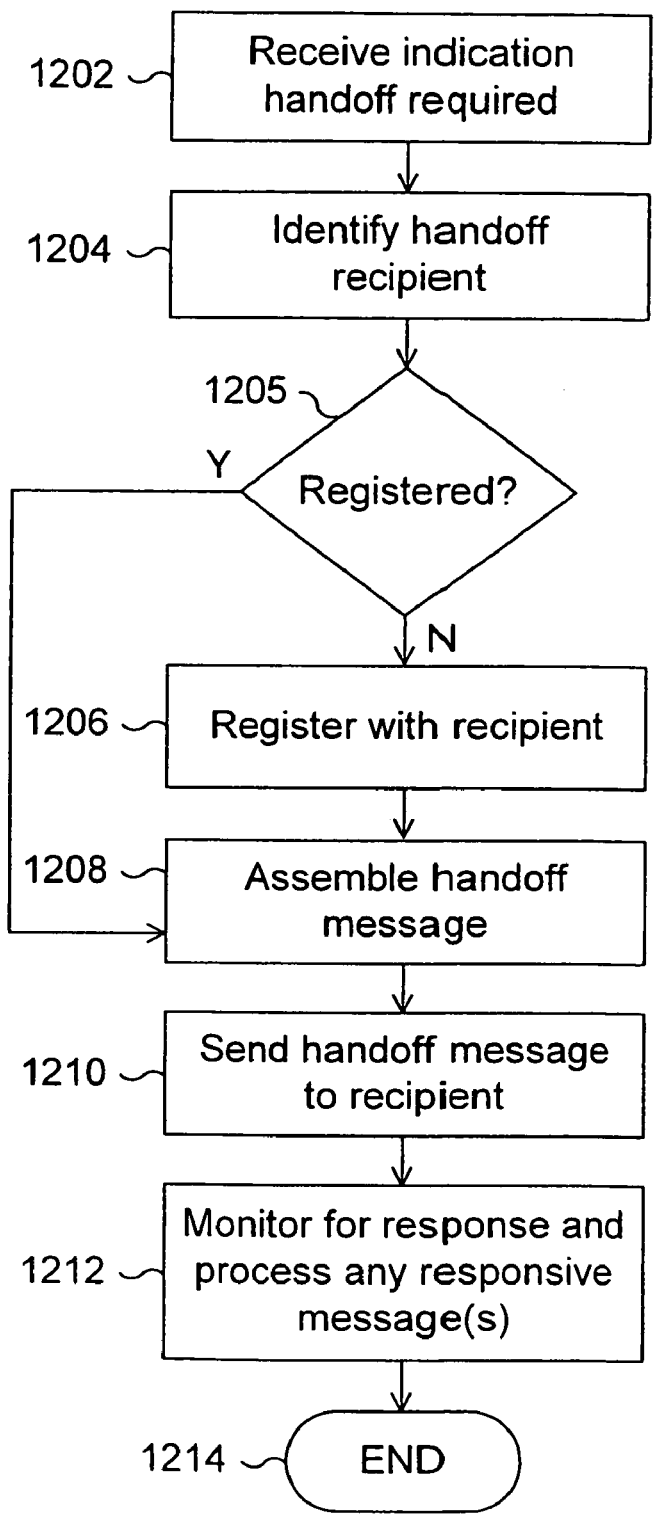
FIG. 12 is a flowchart illustrating a process used in one embodiment to provide a handoff of information concerning an attack from a tracking system in one administrative domain to a destination outside of that administrative domain.

FIG. 12 is a flowchart illustrating a process used in one embodiment to provide a handoff of information concerning an attack from a tracking system in one administrative domain to a destination outside of that administrative domain. The process begins with step 1202 in which an indication that a handoff is required is received. In one embodiment the indication is received when the analysis framework module learns from the policy database that the required responsive action with respect to an incident includes providing a handoff of information to another administrative domain.

In step 1204 the proper recipient of the handoff message is identified. In one embodiment, the handoff recipient is identified by identifying an administrative domain that is the source from which the attacking messages are entering the administrative domain being protected by the sending tracking system. In one embodiment, the handoff message is sent to an administrative domain associated with one or more cookies present on messages associated with the attack. In one embodiment, the specific recipient of the handoff message is determined by querying the RWHOIS database to identify the e-mail address for an individual responsible for network administration and/or security matters for the recipient administrative domain. In one embodiment, a database of information concerning compatible tracking systems installed in other administrative domains is consulted to determine whether the recipient administrative domain has a compatible tracking system installed. In one embodiment, the database consulted to determine if a compatible tracking system is installed at the recipient administrative domain is a remote database maintained by a trusted third party containing information concerning tracking systems installed in various administrative domains. In one embodiment, the database of information concerning compatible tracking systems installed in other administrative domains is a database maintained locally by the sending tracking system and its associated database. In one embodiment, the locally maintained database is the configuration database 332 illustrated in FIG. 3 and described above.

In step 1205, it is determined whether the handoff sender is currently registered with the handoff recipient. If it is determined in step 1205 that the sender is currently registered with the recipient, the process proceeds to step 1208 in which a handoff message is assembled as described more fully below. If it is determined in step 1205 that the sender is not currently registered with the recipient, the process proceeds to step 1206, in which the sending system registers with the handoff recipient.

In one embodiment, the sending system registers directly with the compatible tracking system installed at the destination administrative domain. In one embodiment, the sending system registers with a trusted third party, which third party receives the handoff message, registers with the compatible tracking system in the destination administrative domain, and forwards the handoff message to the compatible tracking system in the destination administrative domain. In one embodiment, both the sending system and the receiving system register with a trusted third party, independent of one another, and the third party receives the handoff message and forwards the handoff message to the compatible tracking system in the destination administrative domain. In one embodiment, the registration process comprises identifying the sending system to the receiving system; computing and negotiating secret data, such as encryption keys and/or seeds to be used to generate random sequence numbers, as described below; obtaining from the receiving system network data, such as the network prefixes served by the receiving system; and designating and communicating to the sending system the address and port to be used to send handoff messages to the handoff receiver module within the receiving system.

In step 1208, the sending system assembles a handoff message. The handoff message is directed to the address and port for the handoff receiver at the receiving system, as specified during the registration process. In one embodiment, the handoff message includes a cryptographic certificate to enable the receiving system to verify the identity of the sending system. In one embodiment, the certificate is a standard X509 certificate or a standard compact certificate, if available, such as a certificate according to ANSI (Proposed) Standard X9.68. In one embodiment, a non-standard compact certificate issued by a certificate authority for use in the tracking systems is used. In one embodiment, the certificate is small enough to enable registration packets to remain under 576 bytes, such that no fragmentation is required and UDP (User Datagram Protocol) may be used to communicate registration packets between tracking systems in different administrative domains. In one embodiment, the handoff message includes a cryptographic signature, such as an RSA signature according to RSA Labs PKCS #1 standard, to enable the receiving system to verify the identity of the sending system. In one embodiment, the handoff message includes a hashed message authentication code (HMAC) which may be used by the receiving system to determine whether the message has been altered, modified, or otherwise tampered with prior to its being received by the receiving system. An example of an HMAC is that in Internet RFC 2104. In one embodiment, the handoff message is an encrypted message. In one embodiment, the handoff message is encrypted using a protocol for sending encrypted electronic mail messages such as S/MIME.

In step 1210, the handoff message is sent to the receiving system. In step 1212, the sending system monitors the port being used to exchange handoff messages with the receiving system for any responsive messages. In one embodiment, the sending system may request a reply concerning the handoff message such as a reply indicating corrective action taken by or further information gathered by the recipient system. In such an embodiment, if a reply has been requested, the sending system in step 1212 monitors the appropriate communication port for the reply. In one embodiment, if a prescribed period of time has passed without receiving an acknowledgement or reply concerning a handoff message, the sending system may send a status request to the receiving system to inquire as to the status of the processing of the handoff by the receiving system. In such an embodiment, if a status request is sent, the sending system in step 1212 monitors the appropriate communication port for a status reply message containing data indicating the status of the processing by the receiving system. In one embodiment, the receiving system may be configured to generate an error message if certain error conditions are present, such as the receiving system is off line or is unable to process the handoff message. In such an embodiment, the sending system in step 1212 receives the error message, interprets the error message, and takes appropriate action, such as attempting to resend the handoff message, attempting to register again with the receiving system, and/or sending an alert or notification to the system security administrator for the administrative domain in which the sending system is located.

Once any responsive messages have been received and processed in step 1212, the process ends in step 1214.

Figure 13:
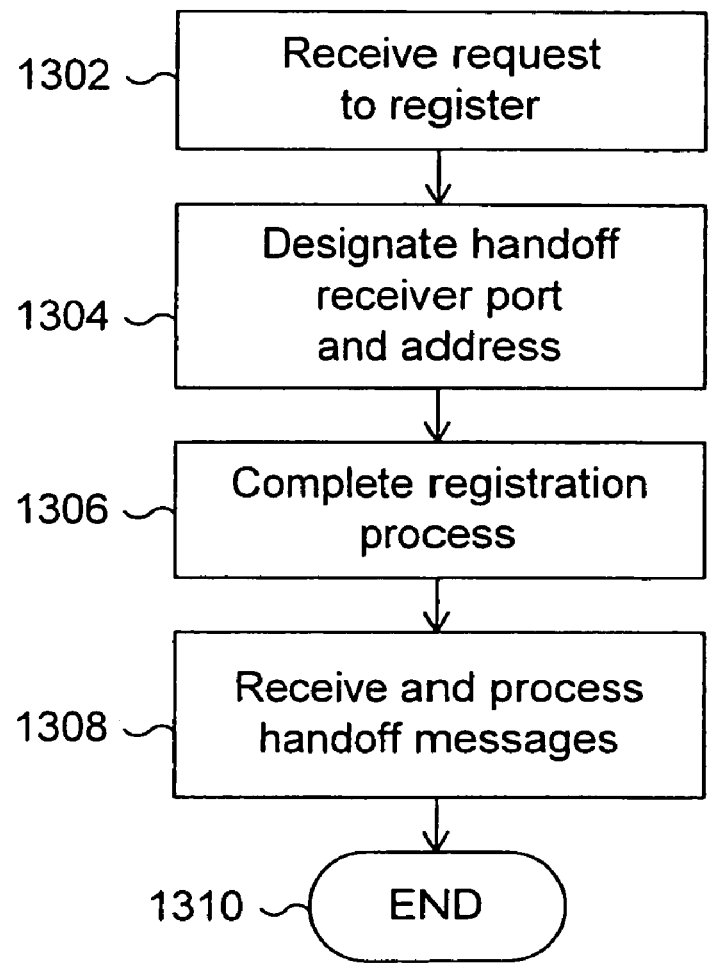
FIG. 13 is a flowchart illustrating a process used in one embodiment to receive and process a handoff from another administrative domain, from the perspective of the tracking system installed at the destination, (i.e. receiving) administrative domain.

FIG. 13 is a flowchart illustrating a process used in one embodiment to receive and process a handoff from another administrative domain, from the perspective of the tracking system installed at the destination, (i.e. receiving) administrative domain. The process begins with step 1302 in which a request to register is received by the receiving system. In step 1304, the receiving system designates a handoff receiver port and address to be provided to a properly authenticated sending system to enable the sending system to send handoff messages to the receiving system. In one embodiment the registration request is received at a fixed and pre-determined port and address. This port and address are fixed and pre-determined so that tracking systems in other administrative domains, or if applicable any trusted third party intermediaries used to relay handoff information between administrative domains, will know in advance the proper port and IP address to which to address a request to register with the receiving system.

In step 1306, the remaining aspects of the registration process are completed, as described above and explaining more fully below.

In step 1308 of the process shown in FIG. 13, the receiving system receives and processes handoff messages from the sending system. In one embodiment, the processing of messages received from the sending system may include any of the responsive actions described in detail above that may be taken when information concerning an attack is received by the handoff receiver module implemented in the tracking system. As described above with respect to step 1212 of FIG. 12, the processing of handoff messages may include sending a reply to the sending system once the information needed for such a reply is available and/or the action required to be taken in response to the handoff message has been taken. Also as described above, the processing of handoff messages may include obtaining status information and sending a status reply in response to a status request message, or sending an error message if an error condition is present. In one embodiment, the handoff message may include embedded text to be sent to the network security administrator or other responsible party in the form of an e-mail message. Once the handoff messages have been received and processed, the process shown in FIG. 13 ends at step 1310.

Figure 14:
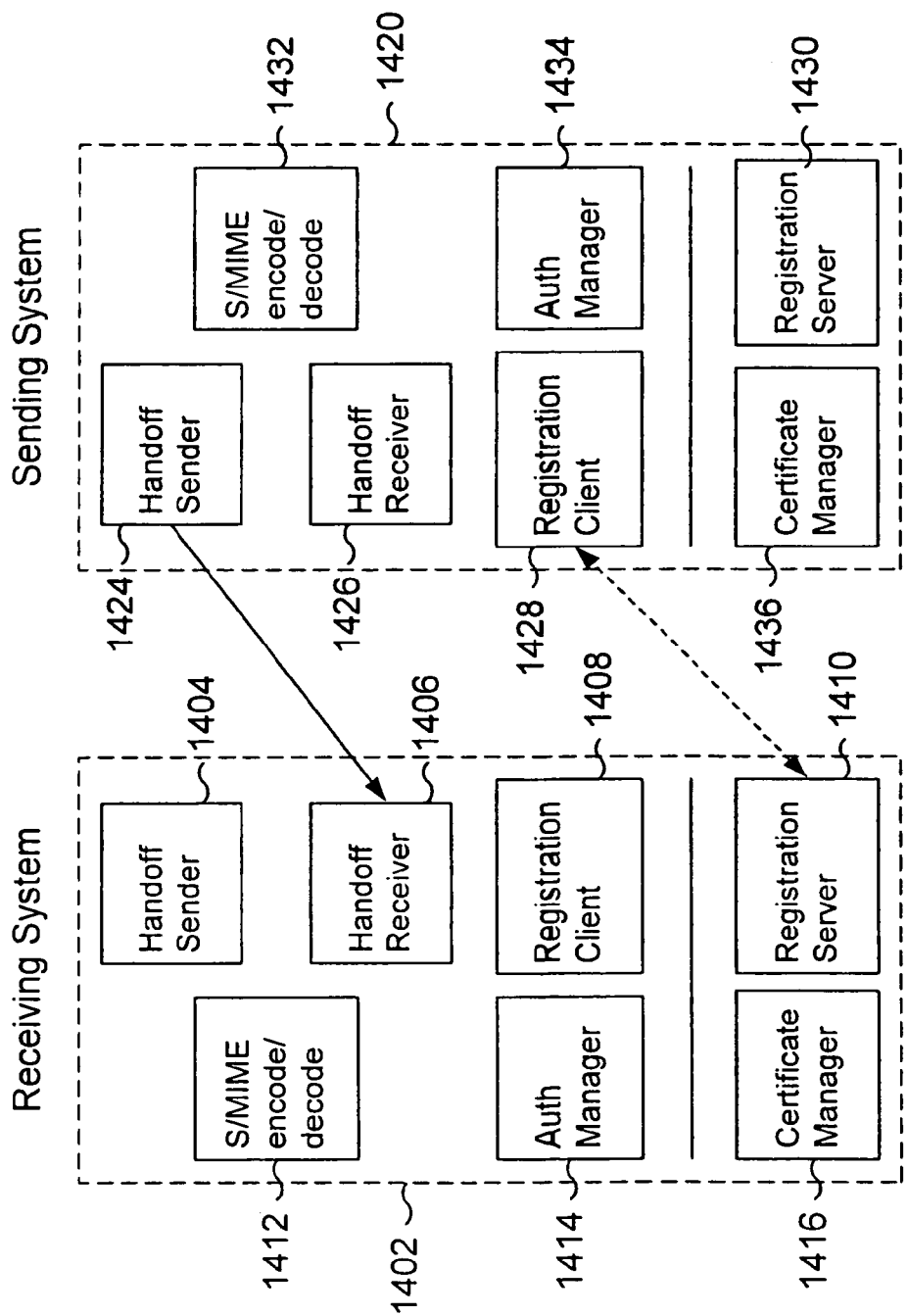
FIG. 14 is a block diagram illustrating certain of the functional modules installed on the receiving system and the sending system, respectively, to enable each system to send and receive handoff messages.

FIG. 14 is a block diagram illustrating certain of the functional modules installed on the receiving system and the sending system, respectively, to enable each system to send and receive handoff messages. The modules include a handoff processing module 1402 on the receiving system side and a corresponding handoff processing module 1420 on the sending system side. The receiving system handoff processing module includes a handoff sender module 1404 and a handoff receiver module 1406. The handoff sender module 1404 is configured to send handoff messages to another tracking system and the handoff receiver module 1406 is configured to receive, process, and respond to handoff messages received from other tracking systems. The sending system handoff processing module 1420 contains a corresponding handoff sender module 1424 and a corresponding handoff receiver module 1426. The handoff sender modules 1404 and 1424 correspond to the handoff sender module 312 in FIG. 3. The handoff receiver 1406 and handoff receiver module 1426 correspond to the handoff receiver module 302 in FIG. 3. The remaining functional modules contained within the receiving system handoff processing module 1402 and the sending system handoff processing module 1420 are not illustrated in FIG. 3. As shown in FIG. 14, the sending system handoff sender module 1424 is the module that would be used to send handoff messages from the sending system to the receiving system. Also as shown in FIG. 14, the handoff receiver module 1406 at the receiving system would be the functional module used to receive, process, and respond to the handoff messages from the handoff sender of the sending system.

As described above, and as is described more fully below, the handoff messages would not be sent from the handoff sender to the handoff receiver until after the registration process has been completed. The receiving system handoff processing module 1402 includes a registration client 1408 and a registration server 1410. The registration client 1408 is configured to initiate a request to register with another tracking system to which a handoff is to be sent. The registration server 1410 is configured to receive and process a request from the registration client at another tracking system to register with the receiving system. The sending system handoff processing module 1420 contains a corresponding registration client 1428 and a corresponding registration server 1430. As illustrated in FIG. 14, if the sending system desired to send a handoff message to the receiving system, the sending system would first use the registration client 1428 to register with the receiving system by means of communications with the registration server module 1410 in the receiving system handoff processing module 1402. This registration process is described more fully below in connection with FIG. 16.

The receiving system handoff processing module 1402 optionally includes an S/MIME encode/decode module 1412. The S/MIME encode/decode module 1412 is used to encode messages being sent by the receiving system or to decode encrypted messages received by the receiving system in cases where it is determined during the registration process that encrypted messages will be used. The sending system handoff processing module 1420 contains a corresponding S/MIME encode/decode module 1432.

The receiving system handoff processing module 1402 also includes an authentication manager 1414. The authentication manager 1414 is used to authenticate messages received by the receiving system. In one embodiment, the authentication manager 1414 is configured to receive a message and a hashed message authentication code (HMAC) associated with the message and to determine if the HMAC is correct for the message received. If the HMAC is not correct for the message received, the result may be an indication that the message was delayed or tampered with en route. The sending system handoff processing module 1420 contains a corresponding authentication manager 1434.

The receiving system handoff processing module 1402 also contains a certificate manager 1416. The certificate manager 1416 is used to process certificates in messages received by the receiving system and to provide the certificate or certificates to be used by the receiving system in sending its own messages. In one embodiment, the certificate manager 1416 is configured to verify the validity of a certificate received in a message received by the receiving system by accessing a database maintained by a certification authority that issues valid certificates to authorized users. The sending system handoff processing module 1420 contains a corresponding certificate manger 1436.

Figure 15:
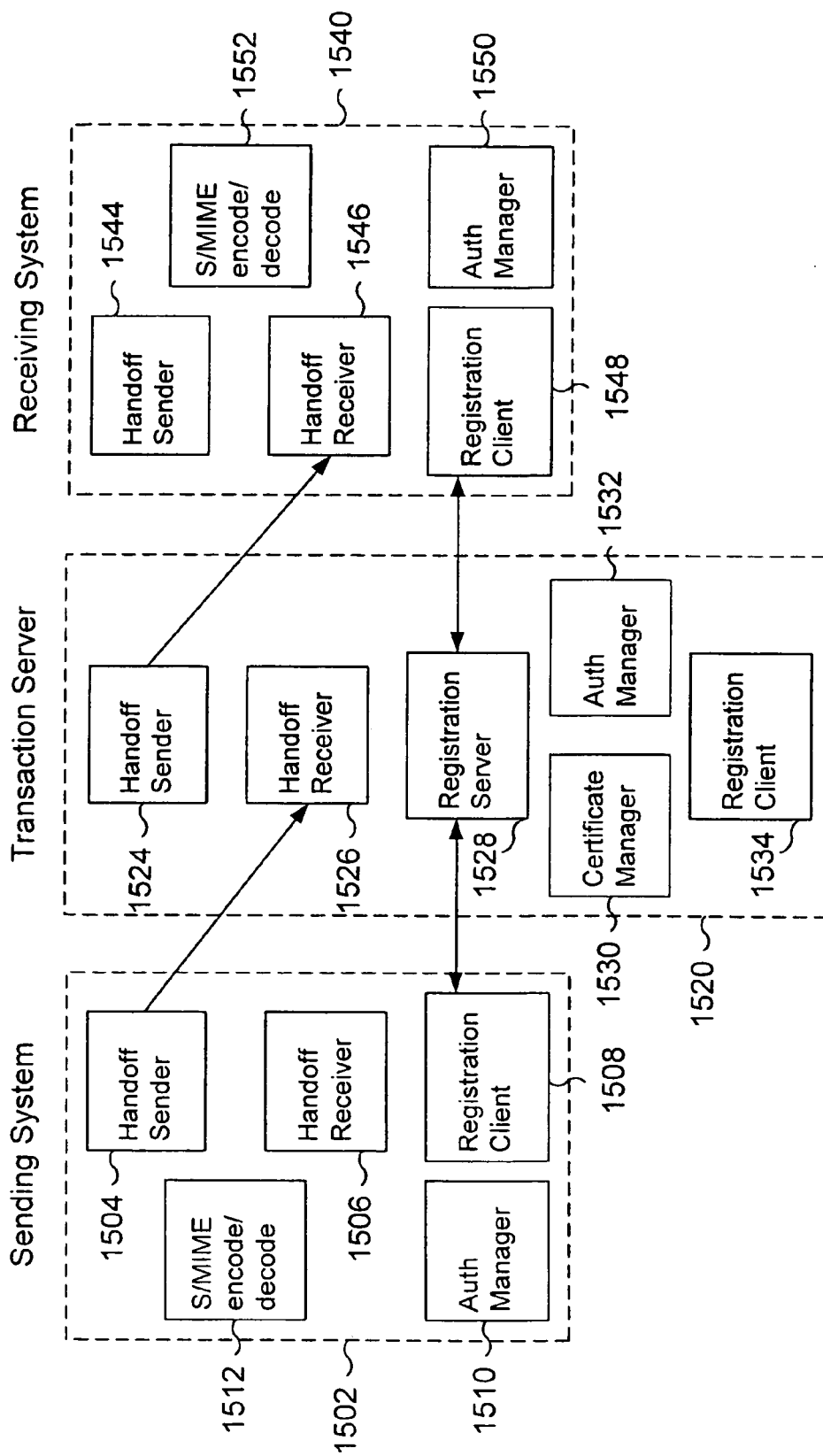
FIG. 15 is a block diagram illustrating the functional blocks involved in sending a handoff message between administrative domains in an embodiment in which a third party intermediary is used to relay the handoff information.

FIG. 15 is a block diagram illustrating the functional blocks involved in sending a handoff message between administrative domains in an embodiment in which a third party intermediary is used to relay the handoff information. The applicable function modules include a sending system handoff processing module 1502, a third party intermediary transaction server handoff processing module 1520, and a receiving system handoff processing module 1540.

The sending system handoff processing module 1502 includes a handoff sender 1504, a handoff receiver 1506, a registration client 1508, an authentication manager 1510, and an S/MIME encode/decode module 1512.

The transaction server handoff processing module 1520 includes a handoff sender 1524, a handoff receiver 1526, a registration server 1528, a certificate manager 1530, an authentication manager 1532, and a registration client 1534.

The receiving system handoff processing module 1540 includes a handoff sender 1544, a handoff receiver 1546, a registration client 1548, an authentication manager 1550, and an S/MIME encode/decode module 1552.

In the illustrative approach shown in FIG. 15, the sending system registration client 1508 is used to register the sending system with the transaction server by communicating with the registration server 1528 at the transaction server. Separately, the receiving system registers with the transaction server by means of the receiving system registration client 1548 communicating with the transaction receiver registration server 1528. Registering with the transaction enables the sending system and receiving system, respectively, to send or receive handoff information to the transaction server for processing and further communication when needed. In the example shown in FIG. 15, the sending system uses the sending system handoff sender 1504 to send handoff information to the handoff receiver 1526 at the transaction server. The handoff sender 1504 of the sending system learns the port and address to use for the handoff receiver of the transaction server through the registration process. The transaction server handoff receiver 1526 receives and processes the handoff messages received from the sending system, including by forwarding the information to the transaction server handoff server module 1524. The transaction server uses transaction handoff server 1524 to send a handoff message containing the handoff information to the receiving system handoff receiver 1546. The handoff server 1524 knows the address and port to use for the receiving system handoff receiver by virtue of information obtained from the receiving system through the registration process. In the embodiment shown in FIG. 15, only the transaction server has a certificate manager. This is because the transaction server acts as a trusted third party and authenticates the certificates of the sending system and receiving system, thereby relieving the separate tracking systems of the responsibility for authenticating certificates.

As illustrated in FIG. 15, the transaction server may be configured with a registration client 1534. The transaction server 1534 registration client 1534 is omitted in one embodiment. In one embodiment, the transaction server is equipped with a registration client 1534 to be used to link the transaction server in a chain with one or more other transaction servers to form a bridge between a sending system and a receiving system. In such an embodiment, the registration client of an upstream transaction server would register with the registration server of a downstream transaction server and so on down the chain so that each link in the chain would be configured to forward handoff information to the next transaction server in the chain until the receiving system is reached. The remaining modules illustrated in FIG. 15 operate in the similar manner to the corresponding modules of FIG. 14.

Figure 16:
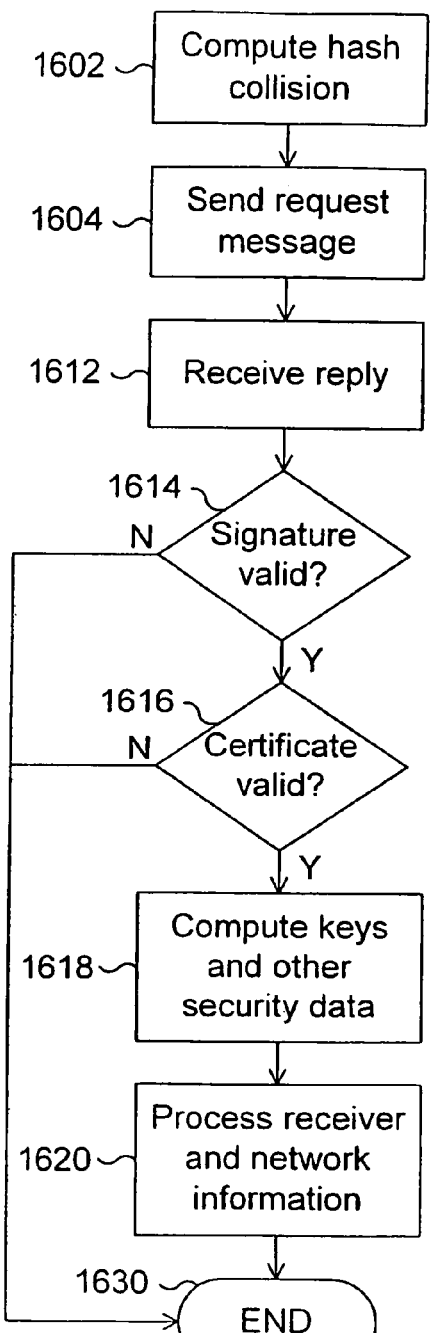
FIG. 16 is a flowchart illustrating a process used in one embodiment by the registration client of a sending system to register with a compatible tracking system associated with an administrative domain to which the sending system desires to send a handoff message.

FIG. 16 is a flowchart illustrating a process used in one embodiment by the registration client of a sending system to register with a compatible tracking system associated with an administrative domain to which the sending system desires to send a handoff message.

Figure 17:
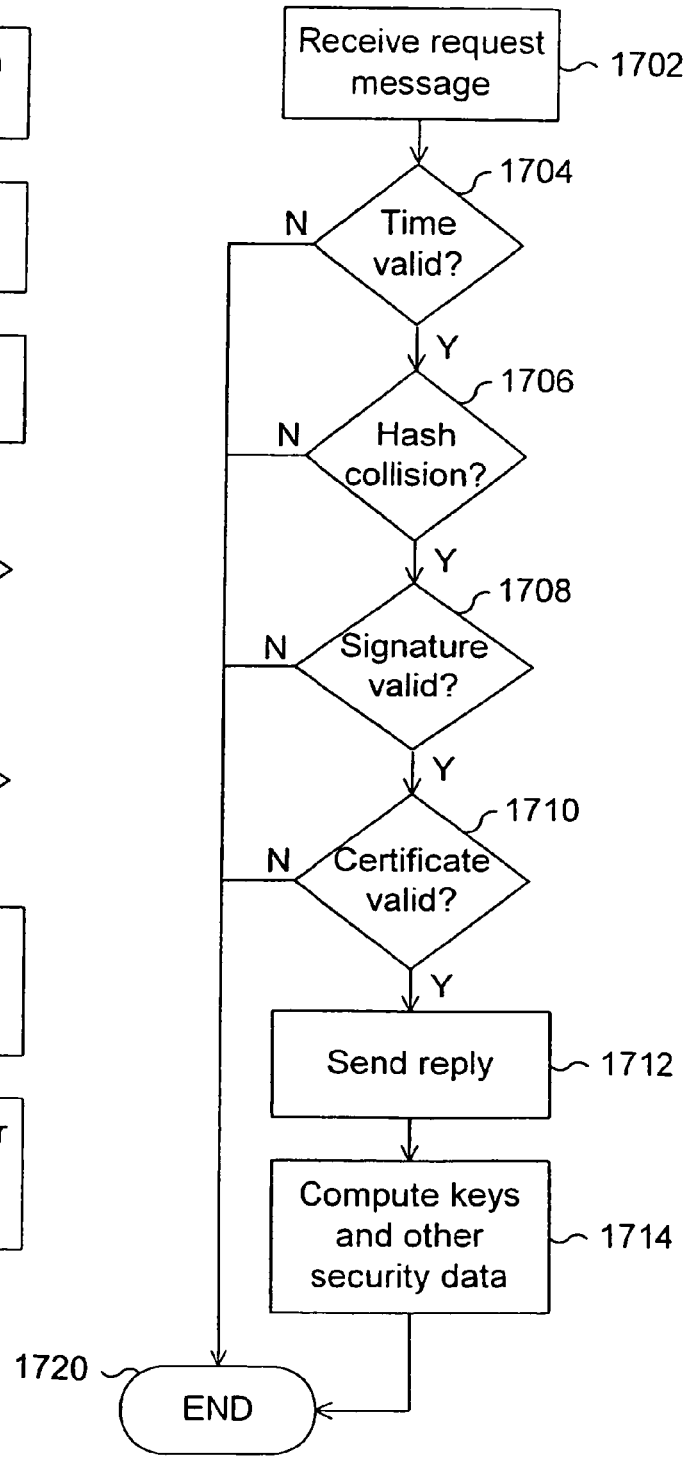
FIG. 17 is a flowchart illustrating a process used in one embodiment by the registration server of a receiving system to permit a sending system to register with a receiving system for purposes of transferring handoff information.

FIG. 17 is a flowchart illustrating a process used in one embodiment by the registration server of a receiving system to permit a sending system to register with a receiving system for purposes of transferring handoff information. The processes illustrated in FIGS. 16 and 17 will be described in parallel.

The process shown in FIG. 16 begins with step 1602 in which a so-called hash collision is computed by the sending system. In one embodiment, the hash collision is computed by finding a random number R1 the cryptographic hash function value of which provides a sufficient match with the cryptographic hash function value of the sending system serial number, the sender IP address, the receiver IP address, the collision timestamp (i.e., the time at which the hash collision was calculated), and a second random number R2. Stated another way, the sending system finds random numbers R1 and R2 such that HASH (R1)=HASH(serial number, sender IP address, receiver IP address, hash collision time, R2). In one embodiment, the first and second random numbers are 32 bit random numbers. In one embodiment, the first and second random numbers are the first 32 bits of random numbers generated by a pseudo random number generator. In one embodiment, the second random number is included in the data used to calculate the second cryptographic hash function value to make it easier for the sender to compute the required hash collision. In one embodiment, the required collision is found when the prescribed number of bits of the first hash value match the corresponding bits in the second hash value after each hash value has been offset by a specified number of offset bits.

In step 1604, the sending system sends an initial request message to the receiving system. In one embodiment, the initial request message includes the sending system serial number, the sender IP address, the receiver IP address, the collision timestamp and the first and second random numbers. In an embodiment in which an offset is used as described above, the initial request message would also include the offset.

Referring to FIG. 17, the process begins in step 1702 in which the receiving system receives the initial request message sent by the sending system in step 1604 of the process illustrated in FIG. 16. In step 1704, the receiving system determines whether the collision timestamp included in the initial request message is valid. In one embodiment, the timestamp is determined to be valid if the timestamp is within a prescribed time window of the current time as measured by the receiving system internal clock. In one embodiment, the prescribed time window is a system parameter. If it is determined in step 1704 that the collision timestamp is not a valid time, the process proceeds to step 1720 in which the process ends and the initial request message is ignored. If it is determined in step 1704 that the collision timestamp is a valid time, it is determined in step 1706 whether the data provided by the sending system in the initial request message results in the required hash collision.

In one embodiment, the receiving system determines whether the required hash collision is present by calculating the cryptographic hash function value of the first random number and comparing it to the cryptographic hash function value of the sending system serial number, sender IP address, receiver IP address, collision timestamp, and the second random number. In one embodiment, the required collision is found to be present if the first 20 bits of the 160 bit hash values match. In one embodiment, as described above, the respective hash values are shifted by a specified number of offset bits prior to being compared. In one such embodiment, the receiving system offsets the respective hash values by the number of offset bits indicated by the offset value provided by the sending system in the initial request message before comparing the respective hash values.

If it is determined in step 1706 that the required hash collision is not present, the process proceeds to step 1720 in which the process ends and the initial request message is ignored. If it is determined in step 1706 that the required hash collision is present, the process proceeds to step 1708 in which the receiving system determines whether the cryptographic signature included in the initial request message is valid. In one embodiment, this is accomplished by ensuring that the sending entity identified by the signature is the same as the sending entity associated with the sender IP address. In one embodiment, cryptographic signatures are not used and step 1708 is omitted. If it is determined in step 1708 that the cryptographic signature provided with the initial request is not valid, the process proceeds to step 1720 in which the process ends and the initial request message is ignored. If it is determined in step 1708 that the signature is valid, or if no signature is required, the process proceeds to step 1710.

In step 1710, it is determined whether the cryptographic certificate included in the initial request message is valid. In one embodiment, this is accomplished by checking a database maintained by the receiving system to determine if the certificate included in the initial request message was issued to an authorized user of a compatible tracking system. In one embodiment, step 1710 includes validating the certificate provided with the initial request message by sending a validation request to a third party certification authority charged with issuing and maintaining an accurate list of currently valid certificates.

If it is determined in step 1710 that the certificate contained in the initial request message is not valid, the process proceeds to step 1710 in which the process ends and the initial request message is ignored. If it is determined in step 1710 that the certificate included in the initial request messages is valid, the process proceeds to step 1712 in which a reply acknowledging the request to communicate and indicating that communication is permitted is sent.

Referring further to FIG. 16, the process continues with step 1612 in which the reply sent by the receiving system in step 1712 of the process shown in FIG. 17 is received by the sending system. In step 1614, the sending system checks the cryptographic signature contained in the reply message in an embodiment in which such cryptographic signatures are used, to determine if the signature is valid. If it is determined in step 1614 that the signature on the reply message is not valid, the process proceeds to step 1630 in which the process ends. The process ends in such a case because the reply likely was received from a source other than the intended receiving system. If it is determined in step 1614 that the signature is valid, or in an embodiment in which cryptographic signatures are not used, the process proceeds to step 1616 in which the certificate included in the reply message is checked to determine if it is a valid certificate. If it is determined in step 1616 that the certificate is not valid, the process proceeds to step 1630 in which the process ends. If it is determined in step 1616 that the certificate included in the reply message is valid, the process proceeds to step 1618 in which encryption keys and any other security data or parameters are computed. From the perspective of the receiving system, the step in the process shown in FIG. 17 that corresponds to step 1618 of FIG. 16 is step 1714, in which the receiving system registration server computes the encryption keys and other secret data. In one embodiment, the sending system in step 1618 and the receiving system in step 1714 compute encryption keys based on Diffie-Hellman parameters exchanged in the initial message sent by the sending system and the reply sent by the receiving system. In one embodiment, the secret data exchanged in the initial and reply messages, as described above and explained more fully below, are seeds to be used by pseudo random number generators at the sending system and receiving system to generate the required sequence numbers to be used for messages sent between the two systems. In one alternative embodiment, the seed and Diffie-Hellman parameter data is exchanged in one or more separate messages sent subsequent to the initial and reply messages.

In one embodiment, certain of the secret data used or exchanged during the registration process is stored in a secure token. In one embodiment, the secure token is issued by a trusted third party. In one embodiment, the secure token data is stored in a token database such as token database 334 of FIG. 3. In one embodiment, the token contains information used to support secure communications between the tracking system and either compatible tracking systems installed in other administrative domains or transaction servers provided by trusted third parties to function as intermediaries between the tracking system and other administrative domains. The token contains various token parameters provided by the tracking system manufacturer or its representative, in one embodiment, to facilitate such communication. In one embodiment, the token parameters include a hardware embedded tracking system serial number, a private key for the tracking system (comprising a modulus and private exponent), a signing public key (such as an RSA key) for the tracking system, a re-keying (disaster recovery) public key to be used along with the signing public key to double sign a special message allowing a key change in the case of compromise of the private key for any reason (this permits the tracking system to remain active until a new secure token is issued by an issuing authority), and storage for the serial numbers and corresponding public keys for other compatible tracking systems.

In one embodiment, the reply message sent in step 1712 includes, among other information, initial handoff receiver and network information. In one alternative embodiment, the initial handoff receiver and network information is sent to the sending system in a separate message subsequent to the sending of the reply sent in step 1712. The handoff receiver information includes the IP address and port to be used by the handoff sender of the sending system to send messages to the handoff receiver of the receiving system. In one embodiment, the IP address for the handoff receiver is fixed and the port is assigned randomly. In one embodiment, a pseudo random number generator scaled to the available port range is used to designate the handoff receiver port. In one embodiment, the host computer system on which the handoff receiver is implemented is multi-homed and more than one IP address is possible for the handoff receiver. In one embodiment, dynamic host addressing is used to make it possible for the IP address of the handoff receiver to be changed. In an embodiment in which the IP address for the handoff receiver is one of a plurality of possible addresses, the IP address is designated using a pseudo random number generator scaled to the range of available IP addresses (or to a range of numbers used to identify the available IP addresses). As described more fully below, the port and, in an embodiment having the required capability, the IP address of the handoff receiver may be changed during the time that the sending system is registered with the receiving system. In such cases the communication link between the registration client and the registration server at the receiving system is used to communicate the new address and/or port for the handoff receiver to the sending system. As described above, the network information sent by the receiving system to the sending system includes, in one embodiment, the network prefixes served by the receiving system.

Referring again to the process shown in FIG. 16, the process continues with step 1620 in which the sending system processes the handoff receiver and network information sent to it by the receiving system. In one embodiment, the processing includes designating the handoff receiver port and IP address as the destination for handoff messages sent to the handoff recipient and associating the network information with the handoff recipient. Once the receiver and network information have been processed, the process shown in FIG. 16 ends in step 1630 and the process shown in FIG. 17 ends in 1720.

Figure 18:
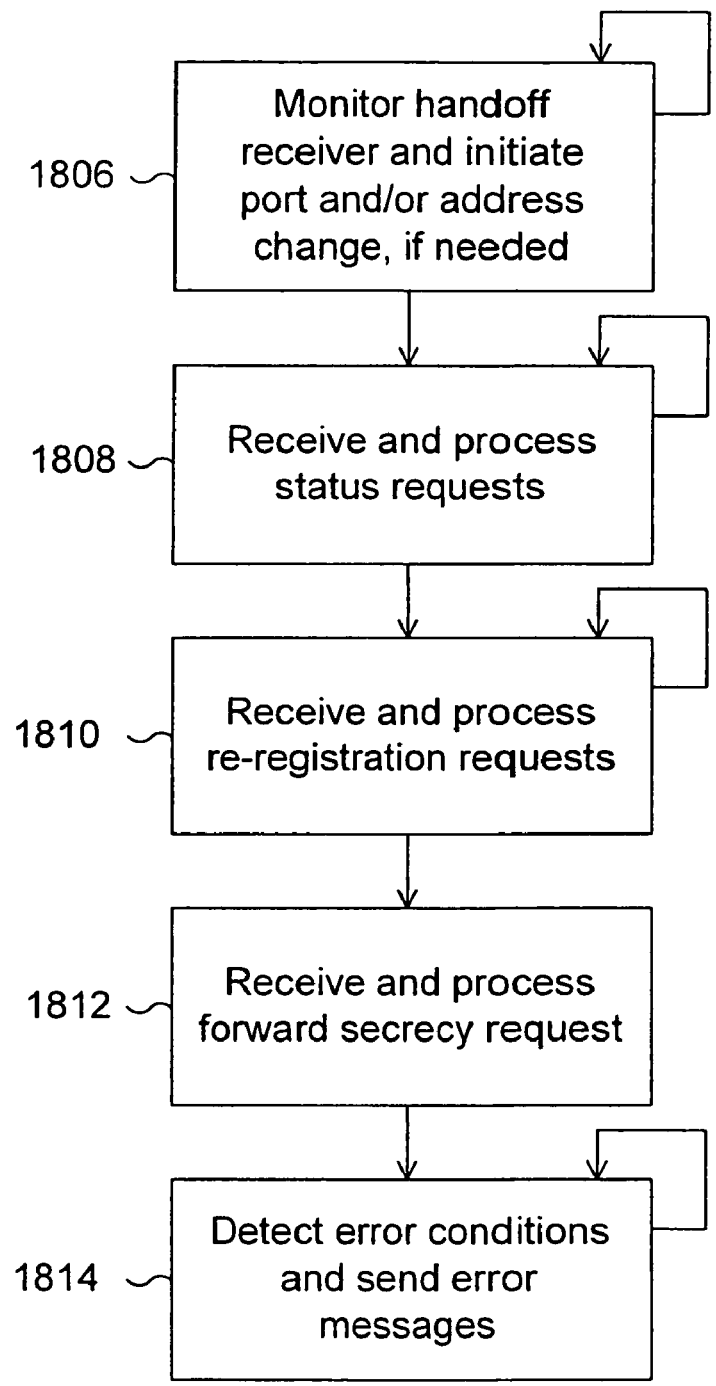
FIG. 18 is a flowchart illustrating a process used in one embodiment by a receiving system to monitor and provide security for the handoff receiver and to perform certain post-registration communication management functions.

FIG. 18 is a flowchart illustrating a process used in one embodiment by a receiving system to monitor and provide security for the handoff receiver and to perform certain post-registration communication management functions.

In step 1806, the handoff receiver module of the receiving system continuously monitors the handoff receiver address and port provided to the sending system and initiates a port and/or address change, if needed, as described more fully below.

In step 1808, the receiving system registration server continually monitors the registration server port to receive and process any status requests that may be sent by the sending system to the receiving system. In one embodiment, using a status exchange protocol, the receiving system may send to the sending system by means of the receiving system registration server data on the network associated with the receiving system, any changes in the receiving system's handoff receiver address and/or port, and any transaction errors. In one embodiment, the status exchange protocol enables the sending system to request, via the registration client, status on pending transactions (i.e. exchanges of handoff information between the sending system and the receiving system via the sending system handoff sender and the receiving system handoff receiver). In one embodiment, the sending system may request status information by means of a status request message. The receiving message responds to such a status request message with an appropriate status message including status data.

In one embodiment, the status information that may be exchanged by means of the status protocol include an indication that a system is going off line which implies that the connection between the systems will be removed), an indication that the system is removing its connection to the other system, a network information update provided by the receiving party to the sending party, a receiver address or port update, an indication that a transaction is pending on a transaction server, an indication that a transaction is pending on a receiving system, an indication that no transaction corresponding to the transaction identified in a status request is pending, and an indication that a particular receiving system is off line (such as may be sent by a transaction server to a sending system if the receiving system with which the sending system wishes to communicate via the transaction server is not currently registered with the transaction server).

In step 1810, the registration server of the receiving system monitors messages being received at the port associated with the registration server of the receiving system and receives and processes any re-registration requests sent to the registration server. In one embodiment, the encryption keys and other secret data exchanged during the registration process may be used to enable the sending system to re-register with the receiving system using an abbreviated protocol if necessary during a handoff process. In one embodiment, the abbreviated protocol enables the sending system to re-register with the receiving system using the current encryption key as negotiated between the sending system and the receiving system during the original registration process. Such re-registration may become necessary, for example, when an extended period of registration is required to transfer handoff information and the original key negotiated during the original registration process is about to expire. In one embodiment, a re-registration request is sent by the sending system to the receiving system which request includes a hash value based at least in part on the current encryption key and other parameters used to calculate the hash value, along with the sending system's certificate and, if applicable, its signature. The receiving system then uses the current key to calculate the re-registration hash value and compares the re-registration hash value with the hash value received in the re-registration request. If the hash values match, and the certificate and/or signature are valid, the re-registration process proceeds as in the original registration process. This abbreviated process saves the sending system from having to perform the computationally intensive task of calculating the hash collision required for a normal initial registration.

In step 1812, the registration server of the receiving system receives and processes any request received at the port associated with the registration server to communicate by means having forward secrecy. Forward secrecy refers to the degree to which a protocol resists compromising secret information protected by one part of the protocol if another part of the protocol is compromised, such as if a user's password is allowed to fall into the hands of an unauthorized party. In order to obtain forward secrecy, it is necessary for the tracking systems to generate one or more session keys to be used to encrypt messages exchanged by the sending system and the receiving system.

In step 1814 of the process shown in FIG. 18, the receiving system detects error conditions and sends error messages to the sending system by means of the registration server at the receiving system and the registration client at the sending system. In one embodiment, such error messages are used to report error conditions that may result in a transaction not being processed correctly or at all. In one embodiment, receipt of an error message indicating that a transaction may not be completed correctly results in the sending system making a second attempt to register with the receiving system and transfer the required information successfully.

Figure 19:
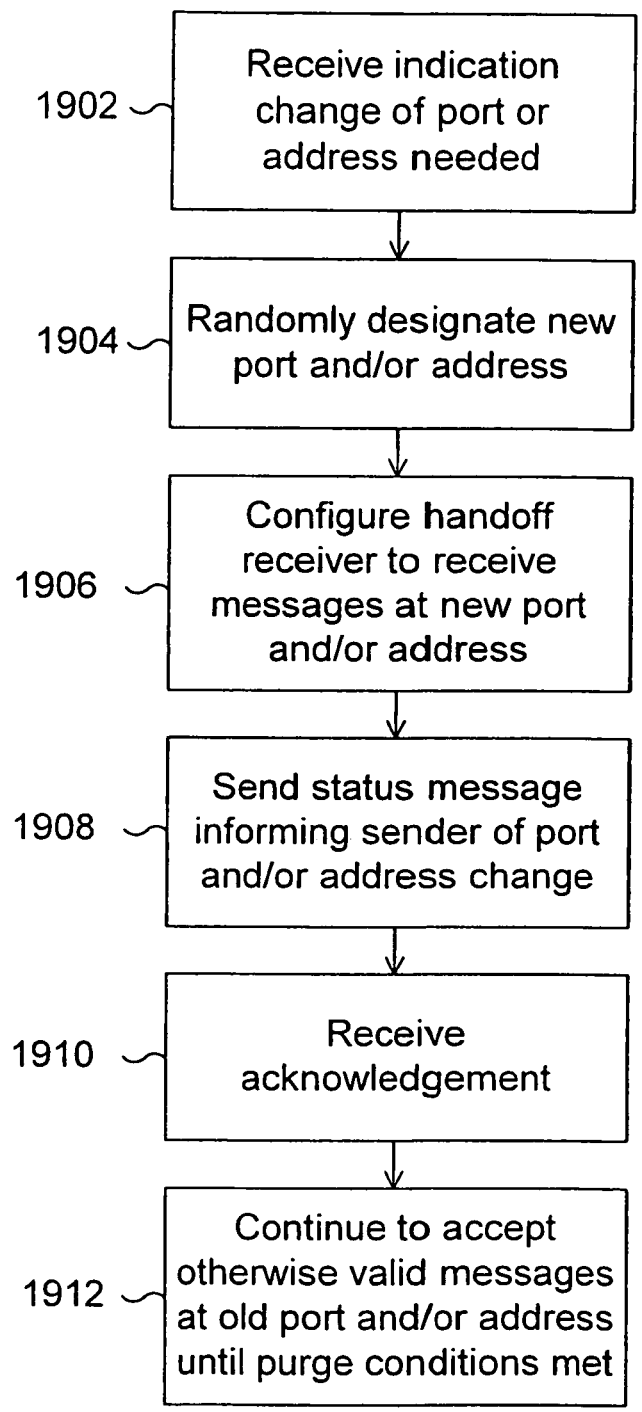
FIG. 19 is a flow chart illustrating a process used in one embodiment to monitor the handoff receiver port and IP address and initiate a port and/or address change, if needed as in step 1806 of FIG. 18.

FIG. 19 is a flow chart illustrating a process used in one embodiment to monitor the handoff receiver port and IP address and initiate a port and/or address change, if needed as in step 1806 of FIG. 18. The process begins with step 1902 in which an indication that a change of port and/or address is needed is received. In one embodiment, the indication may be a system parameter in accordance with which a change is made to the handoff receiver port and/or IP address at prescribed intervals. In one embodiment, the handoff receiver port and/or IP address may be changed at random intervals determined by a pseudo random number generator. In one embodiment, the indication that a change to the port and/or address for the handoff receiver may be a determination that the port is under attack by an attacker seeking to prevent the handoff receiver from performing its functions. In one embodiment, the indication that the handoff receiver port is under attack may be an indication that an unusually large number of packets are being received at the handoff receiver port, or an indication that the handoff receiver module is unable to receive and process handoff information due to an excessive number of packets being received at the port.

In step 1904, a new port and/or IP address is randomly designated. In one embodiment, a new port, if required, is designated by means of a pseudo random number generator scaled to provide a random number in the range of available port addresses. In one embodiment, the new IP address for the handoff receiver, if needed, and if the system is configured to be able to change the IP address of the handoff receiver as described above, the new IP address is determined by means of a pseudo random number generator scaled to the range of available IP addresses (or to a range of numbers used to identify or represent the available IP addresses).

In step 1906 of the process shown in FIG. 19, the handoff receiver module of the receiving system is configured to receive and process messages sent to the new port and/or IP address designated in step 1904.

In step 1908, the receiving system registration server sends a status message to the registration client at the sending system informing the sending system of the new port and/or address for the handoff receiver.

In step 1910, the registration server of the receiving system receives an acknowledgement message from the registration client of the sending system indicating that the status message containing the new handoff receiver port and/or IP address information has been received.

In step 1912, the handoff receiver module of the receiving system continues to accept and process otherwise valid messages received at the old port and/or IP address for the handoff receiver until the purge conditions for no longer monitoring that port have been satisfied. In one embodiment, the handoff receiver continues to accept and process valid messages received at the old port and/or address for a prescribed period of time, after which the old port is purged and no longer monitored by the handoff receiver. In one embodiment, otherwise valid messages received at the old port and/or address are accepted and processed until the next change to the port and/or address of the handoff receiver is made. In one embodiment, the handoff receiver would discontinue accepting otherwise valid messages at the old port and/or address, even if other purge conditions have not yet been met, if the handoff receiver either receives in excess of a prescribed number of packets at the old port and/or address or receives so many packets at the old port and/or address that the handoff receiver cannot process the packets being received.

Figure 20:
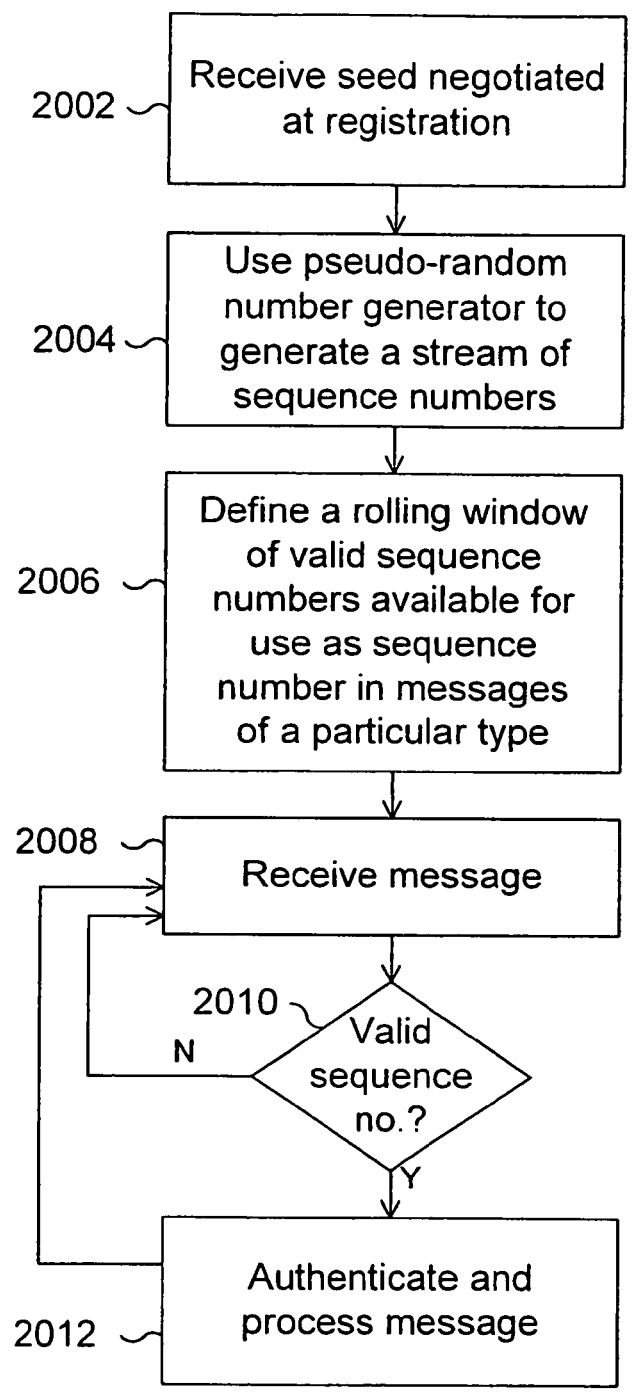
FIG. 20 is a flowchart illustrating a process used in one embodiment to define valid sequence numbers to be used in messages exchanged between a sending system and a receiving system.

FIG. 20 is a flowchart illustrating a process used in one embodiment to define valid sequence numbers to be used in messages exchanged between a sending system and a receiving system. The process begins with step 2002 in which the sending system and the receiving system each receive at least one seed negotiated during the registration process to be used by each system to generate a stream of valid message sequence numbers by means of a pseudo random number generator seeded with the seed. In step 2004, the sending system and the receiving system each use a pseudorandom number generator to generate a stream of valid sequence numbers.

In step 2006, the sending system and the receiving system each define a rolling window of valid sequence numbers available for use as sequence numbers for messages of a particular type sent while the window is in effect. In one embodiment, two different seeds are negotiated during the registration process and one seed is used to generate a stream of valid sequence numbers for messages exchanged between the sending system registration client and the receiving system registration server and the other seed is used to generate a second stream of sequence numbers to be used in messages exchanged between the sending system handoff sender and the receiving system handoff receiver. In one embodiment, each sequence number is 32 bits long. In one embodiment, the rolling window of valid sequence numbers if 40 bytes wide, with the result that there are ten valid sequence numbers in the window at any given time.

In step 2008, a message is received by either the sending system or the receiving system. In step 2010, the system that received the message in step 2008 determines whether the sequence number contained in the message is a valid sequence number. In one embodiment, the sending system and the receiving system are configured to accept a certain number of sequence numbers that are no longer in the valid window but which previously were in the valid window in order to account for transmission delay between the system sending the message and the system receiving the message and message re-ordering. In one embodiment, a system will discontinue accepting and processing messages that have sequence numbers that are no longer in the valid window but which were once in the valid window if more than a prescribed number of such messages have been received during a prescribed time period. If it is determined in step 2010 that the sequence number contained in the message is not valid, the message is ignored and the process returns to step 2008 in which the next message is received. If it is determined in step 2010 that the message contains a valid sequence number, the process proceeds to step 2012 in which the message is authenticated and, if properly authenticated, processed. In one embodiment, the processing of the message includes sending an acknowledgement of the message to the sending party. In one embodiment, the sending of the acknowledgement causes the sequence number window to advance at the message recipient's system and the receipt of the acknowledgement causes the sequence number window to advance at the system that sent the message being acknowledged. The process then returns to step 2008, in which the next message is received.

If a sending system that selects a valid sequence number from the window of currently valid sequence numbers and includes it in a message sent to a destination system does not receive an acknowledgement of the message within a prescribed time, the sending system selects a second valid sequence number and sends a second message to the destination. If the sending system still does not receive an acknowledgement to the second message after a prescribed period of time, the sending system selects a third sequence number and makes a third attempt to send a message to the destination. In one embodiment, the interval between the second and third messages is longer than the interval between the first and second messages. This process may continue if no acknowledgement is received, until the sending system has exhausted the ten available valid sequence numbers in the current window. Once the sequence numbers have been exhausted, in one embodiment the sending system must wait until the window advances and additional sequence numbers become available (e.g., because one or more acknowledgement messages are received) before the sending system can send additional messages to the destination. This has the beneficial effect of metering the number of messages that can be sent by a sending system to a receiving system while any given window is in effect, which limits the possibility for overloading the processing capability of the destination party, either unintentionally in the case of an authorized sending party or intentionally in the case of an attacker attempting to overload the receiving system, because the destination system will not send an acknowledgement message (and thereby advance the window and make one or more additional sequence numbers available) until it has finished processing a received message.

In one embodiment, if all of the sequence numbers available to the handoff sender of the sending system are exhausted without receiving an acknowledgement from the receiving system, the condition is interpreted as indicating that the receiving system handoff receiver is unreachable and further attempts to send handoff information are not made. In one embodiment, if such a condition exists, the separate set of sequence numbers available to the registration client and registration server are used to exchange additional information between the sending system registration client and the receiving system registration server to resynchronize the communications between the handoff sender of the sending system and the handoff receiver of the receiving system. In one embodiment, the resynchronization comprises confirming that the handoff sender is using the correct port and address for the handoff receiver and defining a new window of valid sequence numbers in the sequence number stream. In one embodiment, the resynchronization process includes negotiating a new seed for the sequence stream to be used by the handoff sender and handoff receiver and having each system calculate a new stream of sequence numbers.

If a receiving system is receiving numerous packets, the receiving system need not authenticate each packet and instead may ignore the packets that do not contain valid sequence numbers. Once a sequence number has been used, it may not be used again. As a result, the receiving system is limited to having to authenticate only ten messages during a given window and need only process those messages of the ten that contain proper authentication.

Although the foregoing invention has been described in some detail for purposes of clarity of understanding, it will be apparent that certain changes and modifications may be practiced within the scope of the appended claims. It should be noted that there are many alternative ways of implementing both the process and apparatus of the present invention. Accordingly, the present embodiments are to be considered as illustrative and not restrictive, and the invention is not to be limited to the details given herein, but may be modified within the scope and equivalents of the appended claims.

What is claimed is:

1. A method for detecting and processing attacks on a computer network, comprising:
  receiving a plurality of successive sets of data each set each set being associated with a corresponding security event associated with the computer network;
  placing each set of data in a selected one of a plurality of queues based at least in part on a queue selection algorithm by which sets of data associated with related security events are grouped into the same queue while sets of data associated with unrelated security events are spread across different queues; and
  processing the sets of data by:
    (1) selecting for processing a first set of data from a first queue;
    (2) selecting for processing a next set of data from a next queue in order that contains a set of data; and
    (3) repeating step (2) until no queue contains a set of data that has not yet been selected for processing;
  wherein the queue selection algorithm includes performing a first computation on a first at least a portion of the set of data to obtain a first index, performing a second computation on a second at least a portion of the set of data to obtain a second index, and selecting a queue for the set of data being processed based at least in part on the first and second indices, such that sets of data having the same values for both the first at least a portion of the set of data and the second at least a portion of the set of data are placed in the same queue;
  whereby a critical set of data associated with a critical security event is timely selected for processing even under circumstances in which numerous sets of data associated with a corresponding set of security events that are related to each other but not to the critical security event are received prior to the critical set of data being received.

2. The method of claim 1, wherein the step of processing includes determining the responsive action to be taken.

3. The method of claim 1, wherein the step of processing includes taking action in response to the data.

4. The method of claim 1, further comprising sending an alert concerning the data to a recipient in the administrative domain in which the data was received.

5. The method of claim 4, wherein the alert comprises an e-mail message to an individual.

6. The method of claim 4, wherein the alert comprises activating a pager.

7. The method of claim 1, wherein the data is received at a first system and further comprising sharing information concerning the data with a second system in the same administrative domain as the first system.

8. The method of claim 1, further comprising sending via a trusted third party a handoff message comprising information concerning the data to an administrative domain other than the administrative domain in which the data was received.

9. The method of claim 8, wherein the handoff message is sent directly to the other administrative domain.

10. The method of claim 8, wherein the handoff message is generated and sent automatically, without human intervention.

11. The method of claim 1, further comprising scanning data arriving on at least one port.

12. The method of claim 11, wherein the at least one port is a switch port and the scanning comprises copying the data passing the at least one port to a copy port associated with the switch.

13. The method of claim 12, wherein the scanning further comprises dynamically changing the port being scanned.

14. The method of claim 11, wherein the scanning comprises sending a network management protocol request.

15. The method of claim 11, wherein the scanning comprises searching the data passing the at least one port for a string.

16. The method of claim 11, wherein the scanning comprises searching the data passing the at least one port for a type of message.

17. The method of claim 11, wherein the scanning comprises searching the data passing the at least one port for an attempt to access a service identified as vulnerable to attack.

18. The method of claim 17, wherein the service is the telnet service.

19. The method of claim 1, further comprising classifying the data.

20. The method of claim 1, further comprising classifying the data by type of attack.

21. The method of claim 1, wherein the plurality of queues is organized into a table of queues having at least one row and at least one column.

22. The method of claim 21, wherein the table has R rows and C columns and the selected queue is determined by calculating a row address equal to the modulus R of the first index and a column address equal to the modulus C of the second index.

23. The method of claim 1, wherein the first index is a hash value of a message containing the data.

24. The method of claim 1, wherein the second index is a hash value of the source address of a message containing the data.

25. The method of claim 1, further comprising associating a security event with at least one other security event to which it is related.

26. The method of claim 1, wherein a first security event is associated with a second security event if the first security event and second security event are associated with the same message.

27. The method of claim 1, wherein a first security event is associated with a second security event if the first security event and second security event are associated with the same sub-network and the security event rate for that sub-network exceeds a statistically determined baseline security event rate for the sub-network.

28. The method of claim 1, wherein the processing includes identifying the source of an attack.

29. The method of claim 1, wherein the processing includes tracking messages associated with an attack back to identify a point of attack at which messages associated with the attack are entering the network.

30. The method of claim 29, wherein the tracking comprises:
  providing a network topology map, the map including information concerning the devices that comprise the network and the ports associated with each respective device;
  scanning the ports of a first device for messages associated with the attack, wherein the first device is the device from which the data associated with the attack was first received; and identifying a first port in the first device as the port at which at least one message associated with the attack was received by the first device.

31. The method of claim 30, wherein the tracking further comprises:
   determining whether the first port is an external connection to another administrative domain;
   in the event that the first port is an external connection, identifying the first port as the point of attack; and
   in the event that the first port is not an external connection:
      identifying a second device to which the first device is connected via the first port;
      scanning the ports of the second device for messages associated with the attack; and
      identifying a second port in the second device as the port at which at least one message associated with the attack was received by the second device.

32. A system for detecting and processing attacks on a computer network, comprising:
   a processor configured to:
      receive a plurality of successive sets of data each set each set being associated with a corresponding security event associated with the computer network;
      place each set of data in a selected one of a plurality of queues based at least in part on a queue selection algorithm by which sets of data associated with related security events are grouped into the same queue while sets of data associated with unrelated security events are spread across different queues; and
      process the sets of data by:
         (1) selecting for processing a first set of data from a first queue;
         (2) selecting for processing a next set of data from a next queue in order that contains a set of data; and
         (3) repeating step (2) until no queue contains a set of data that has not yet been selected for processing; and
   a memory associated with the processor and configured to store said plurality of successive sets of data and in said plurality of queues;
   wherein the queue selection algorithm includes performing a first computation on a first at least a portion of the set of data to obtain a first index, performing a second computation on a second at least a portion of the set of data to obtain a second index, and selecting a queue for the set of data being processed based at least in part on the first and second indices, such that sets of data having the same values for both the first at least a portion of the set of data and the second at least a portion of the set of data are placed in the same queue;
   whereby a critical set of data associated with a critical security event is timely selected for processing even under circumstances in which numerous sets of data associated with a corresponding set of security events that are related to each other but not to the critical security event are received prior to the critical set of data being received.

33. A system for detecting and processing attacks on a computer network, comprising:
   means for receiving a plurality of successive sets of data each set each set being associated with a corresponding security event associated with the computer network;
   means for placing each set of data in a selected one of a plurality of queues based at least in part on a queue selection algorithm by which sets of data associated with related security events are grouped into the same queue while sets of data associated with unrelated security events are spread across different queues; and
   means for processing the sets of data by:
      (1) selecting for processing a first set of data from a first queue;
      (2) selecting for processing a next set of data from a next queue in order that contains a set of data; and
      (3) repeating step (2) until no queue contains a set of data that has not yet been selected for processing;
   wherein the queue selection algorithm includes performing a first computation on a first at least a portion of the set of data to obtain a first index, performing a second computation on a second at least a portion of the set of data to obtain a second index, and selecting a queue for the set of data being processed based at least in part on the first and second indices, such that sets of data having the same values for both the first at least a portion of the set of data and the second at least a portion of the set of data are placed in the same queue;
   whereby a critical set of data associated with a critical security event is timely selected for processing even under circumstances in which numerous sets of data associated with a corresponding set of security events that are related to each other but not to the critical security event are received prior to the critical set of data being received.

34. A computer program product for detecting and processing attacks on a computer network, the computer program product being embodied in a computer readable medium and comprising computer instructions for:
   receiving a plurality of successive sets of data each set each set being associated with a corresponding security event associated with the computer network;
   placing each set of data in a selected one of a plurality of queues based at least in part on a queue selection algorithm by which sets of data associated with related security events are grouped into the same queue while sets of data associated with unrelated security events are spread across different queues; and
   processing the sets of data by:
      (1) selecting for processing a first set of data from a first queue;
      (2) selecting for processing a next set of data from a next queue in order that contains a set of data; and
      (3) repeating step (2) until no queue contains a set of data that has not yet been selected for processing;
   wherein the queue selection algorithm includes performing a first computation on a first at least a portion of the set of data to obtain a first index, performing a second computation on a second at least a portion of the set of data to obtain a second index, and selecting a queue for the set of data being processed based at least in part on the first and second indices, such that sets of data having the same values for both the first at least a portion of the set of data and the second at least a portion of the set of data are placed in the same queue;
   whereby a critical set of data associated with a critical security event is timely selected for processing even under circumstances in which numerous sets of data associated with a corresponding set of security events that are related to each other but not to the critical security event are received prior to the critical set of data being received.

* * * * *